(12) United States Patent
Miller

(10) Patent No.: US 6,842,901 B1
(45) Date of Patent: Jan. 11, 2005

(54) THREAD MEMORY RECLAMATION

(75) Inventor: William Miller, Groton, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/326,007

(22) Filed: Jun. 4, 1999

Related U.S. Application Data

(60) Provisional application No. 60/130,777, filed on Apr. 23, 1999.

(51) Int. Cl.$^7$ ................................................ G06F 9/00
(52) U.S. Cl. ..................... 718/104; 718/100; 718/102; 709/226; 711/170
(58) Field of Search ................................ 709/100, 102, 709/104, 226; 711/170

(56) References Cited

U.S. PATENT DOCUMENTS

| | | | |
|---|---|---|---|
| 4,720,850 A | * 1/1988 | Oberlander et al. ..... 379/90.01 |
| 5,619,650 A | 4/1997 | Bach et al. ............ 395/200.01 |
| 5,652,885 A | 7/1997 | Reed et al. ..................... 713/1 |
| 5,835,763 A | * 11/1998 | Klein ........................ 709/101 |
| 5,872,909 A | * 2/1999 | Wilner et al. .................. 714/38 |
| 5,873,127 A | * 2/1999 | Harvey et al. .............. 711/206 |
| 5,893,159 A | * 4/1999 | Schneider .................. 711/150 |
| 6,101,524 A | * 8/2000 | Choi et al. .................. 709/102 |
| 6,247,025 B1 | * 6/2001 | Bacon ........................ 707/206 |
| 6,247,042 B1 | * 6/2001 | Engstrom et al. .......... 709/107 |
| 6,272,518 B1 | * 8/2001 | Blazo et al. ................. 709/102 |
| 6,289,424 B1 | * 9/2001 | Stevens ...................... 711/170 |
| 6,292,820 B1 | * 9/2001 | Korn ........................... 709/100 |
| 6,298,422 B1 | * 10/2001 | Spilo et al. .................. 711/154 |
| 6,462,745 B1 | * 10/2002 | Behrbaum et al. .......... 345/543 |
| 6,480,952 B2 | * 11/2002 | Gorishek et al. ........... 712/227 |
| 6,510,504 B2 | * 1/2003 | Satyanarayanan ........... 711/170 |

OTHER PUBLICATIONS

Joy et al. "Locking of computer resources". US Pat. Application Publication 2003/0070021 A1.*
Wright, Daniel. "Shared virtual desktop collaborative application system." US Pat. Application publication 2001/0004746 A1.□□.*
Bonola, Thomas. "System, method, and apparatus for providing linearly scalable dynamic memory management in multiprocessing system". US. Pat. application publication 2002/0099921 A1.*
"Notes on Writing Portable Programs in C," Dolenc et al., Nov. 1990, 8$^{th}$ Revision, Mar. 3, 1995.

* cited by examiner

Primary Examiner—Thomas Lee
Assistant Examiner—Lilian Vo
(74) Attorney, Agent, or Firm—Steubing McGuinness & Manaras LLP

(57) ABSTRACT

An apparatus and method of managing memory utilized by a process executing on a computer system with an operating system frees memory segments allocated to threads (in the process) if it is determined that such threads have stopped operating. To that end, messages forwarded between the process and operating system are intercepted. The location of a memory segment that is allocated to a given thread in the process then is ascertained from at least one of the intercepted messages. The given thread thus is monitored and its allocated memory segment is freed if it is determined that the given thread has stopped operating.

45 Claims, 17 Drawing Sheets

THREAD MEMORY RECLAMATION

PRIORITY

This application claims priority from U.S. provisional patent application Ser. No. 60/130,777, filed Apr. 23, 1999, entitled "MODULAR ROUTING SYSTEM" and bearing, the disclosure of which is incorporated herein, in its entirety, by reference.

Cross References to Related Applications

This patent application may be related to the following commonly-owned United States patent applications, each of which is incorporated in its entirety by reference:

U.S. patent application Ser. No. 09/326,733 entitled MODULAR ROUTING SYSTEM, filed on even date herewith, and hereby incorporated by reference in its entirety;

U.S. patent application Ser. No. 09/326,022 entitled APPARATUS AND METHOD FOR MANAGING COMMUNICATION BETWEEN A FAILED APPLICATION AND OTHER EXECUTING APPLICATIONS, filed on even date herewith, and hereby incorporated by reference in its entirety;

U.S. patent application assigned Ser. No. 09/326,021 entitled APPARATUS AND METHOD FOR FORWARDING MESSAGES BETWEEN TWO APPLICATIONS, filed on even date herewith, and hereby incorporated by reference in its entirety;

U.S. patent application Ser. No. 09/326,035 entitled APPARATUS AND METHOD FOR ESTABLISHING COMMUNICATION BETWEEN APPLICATIONS, filed on even date herewith, and hereby incorporated by reference in its entirety;

U.S. patent application Ser. No. 09/326,099 entitled APPARATUS AND METHOD FOR CREATING BYPASS PATHS BETWEEN APPLICATIONS, filed on even date herewith, and hereby incorporated by reference in its entirety;

U.S. patent application Ser. No. 09/326,019 entitled APPARATUS AND METHOD FOR MONITORING MESSAGES FORWARDED BETWEEN APPLICATIONS; filed on even date herewith, and hereby incorporated by reference in its entirety;

U.S. patent application Ser. No. 09/326,238 entitled APPARATUS AND METHOD OF MANAGING AND CONFIGURING A NETWORK DEVICE, filed on even date herewith, and hereby incorporated by reference in its entirety; and U.S. patent application Ser. No. 09/325,892 entitled ROUTER TABLE MANAGER, filed on even date herewith, and hereby incorporated by reference in its entirety.

FIELD OF THE INVENTION

The invention generally relates networks and, more particularly, the invention relates to forwarding data across a computer network.

BACKGROUND OF THE INVENTION

The Internet utilizes many data forwarding devices (e.g., routers and switches) to forward data messages between network nodes. Among other things, such forwarding devices include both routing software and a corresponding routing hardware platform that cooperate to forward data messages to their appropriate destinations. Undesirably, routing software within current forwarding devices generally is preconfigured for use within one specific routing hardware platform only. In particular, a forwarding device (e.g., a router) manufactured by a given vendor has routing software that is specifically configured for use with no routing hardware platform other than that of the given vendor. Accordingly, such routing software from one vendor cannot be used on another vendor's forwarding device.

In addition, as is known in the art, many software processes (e.g., data routing protocols) utilize a plurality of threads to improve system performance. As is known in the art, when a thread stops operating (i.e., stops performing its underlying function properly, stops executing etc . . .), the memory allocated to it by the underlying operating system typically is not usable by other processes or threads until its parent process stops executing. This can create a memory shortage in a computer system, creating a variety of performance problems.

SUMMARY OF THE INVENTION

In accordance with one aspect of the invention, an apparatus and method of managing memory utilized by a process executing on a computer system with an operating system frees memory segments allocated to threads (in the process) if it is determined that such threads have stopped operating. To that end, messages forwarded between the process and operating system are intercepted. The location of a memory segment that is allocated to a given thread in the process then is ascertained from at least one of the intercepted messages. The given thread thus is monitored and its allocated memory segment is freed if it is determined that the given thread has stopped operating. The process may include at least one thread.

In preferred embodiments, among other things, a thread that has stopped executing, corrupts other processes or threads, is not executing its prescribed function, or is malfunctioning in some manner is deemed to have stopped executing. The location of the memory segment preferably is stored in a memory device. Accordingly, the memory segment may be freed by retrieving the location of the memory segment from the memory device, and then forwarding a release message to the operating system. The release message includes both data identifying the location of the memory segment, and a request to free the memory segment. The operating system preferably utilizes a standard application program interface (e.g., POSIX).

In accordance with another aspect of the invention, an apparatus and method of managing memory utilized by a process (having at least one thread) executing on a computer system with an operating system receives a memory allocation request from the process. The memory allocation request is directed from the process toward the operating system and requests that the operating system allocate a memory segment for a given thread in the process. The memory allocation request then is forwarded to the operating system, which responsively allocates a memory segment for the given thread. A memory segment message then is received (from the operating system) identifying the location of the memory segment allocated for the given thread. The location of the memory segment then is stored, and a memory allocation reply message is forwarded to the process. The reply message identifies the location of the memory segment of the given thread.

In preferred embodiments, the apparatus and method also monitors the given thread, and frees the memory segment if it is determined that the given thread has stopped operating. The memory allocation request and memory segment message preferably are received by an interceptor module that is independent from the operating system.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF PREFERRED EMBODIMENTS

Figure 1:
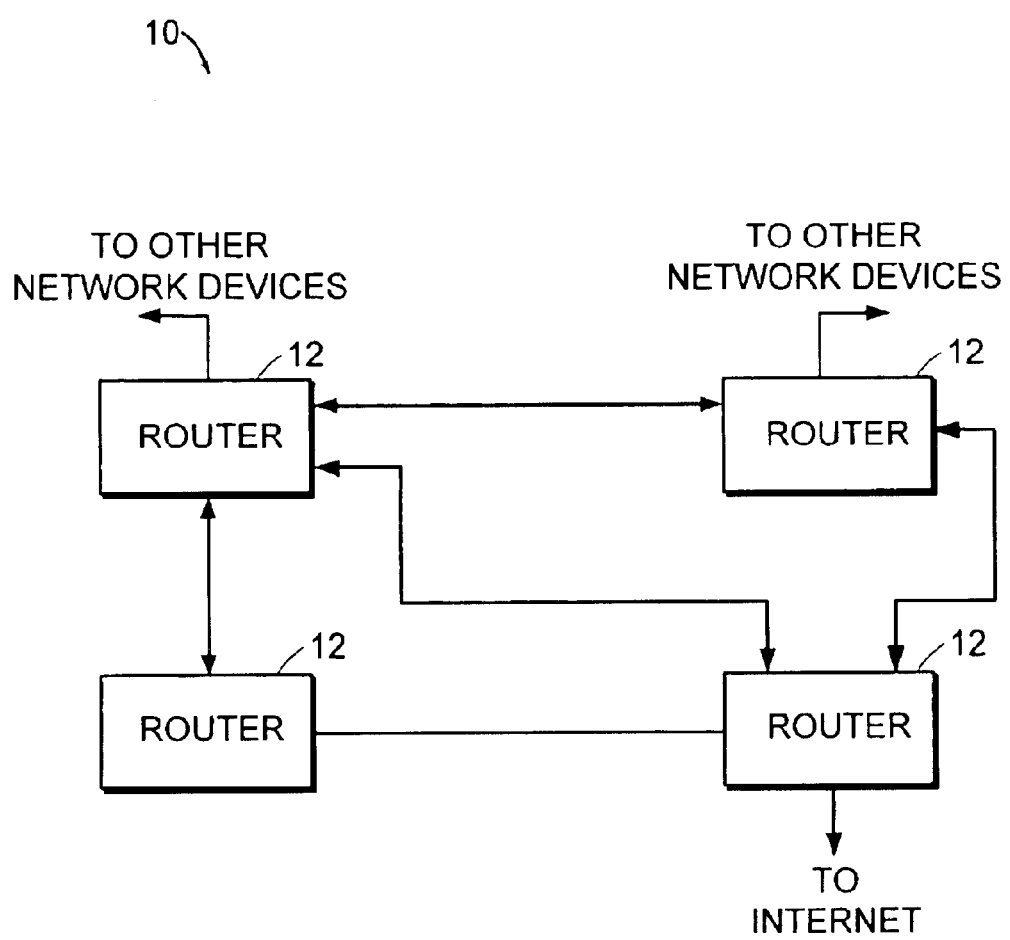
FIG. 1 schematically shows an exemplary network arrangement in which preferred embodiments of the invention may be implemented.

FIG. 1 schematically shows an exemplary network arrangement 10 in which preferred embodiments of the invention may be implemented. The network includes a plurality of routers 12 that cooperate to transmit data messages across the network. Among other uses, each router 12 may be coupled to one or more smaller networks, such as a local area network, and/or may be utilized solely to forward received data messages. Moreover, each router 12 preferably supports more than one data routing protocol and thus, may be coupled with smaller networks that utilize different protocols. For example, one router 12 coupled with the Internet may be coupled to a smaller network that utilizes Asynchronous Transfer Mode ("ATM"). Accordingly, such router 12 includes data routing software to route data messages utilizing either ATM or the Internet Protocol ("IP"). In preferred embodiments, this router 12 includes software that can implement a variety of other routing protocols, such as the Point-to-Point protocol ("PPP").

It should be noted that although only four are shown, the network may include many more routers 12. In addition, routers 12 are discussed herein as exemplary network devices. Those skilled in the art should appreciate that preferred embodiments may be applied to other network devices that forward data messages between other network devices. For example, principles of the invention may be applied to network switches and network bridges. Accordingly, discussion of specific network hardware (e.g., routers 12), specific data transfer protocols (e.g., IP, ATM, etc . . .), and specific operating systems (e.g., WINDOWS or Disk Operating System) is for exemplary purposes only and is not intended to limit the scope of preferred embodiments of the invention.

Figure 2:
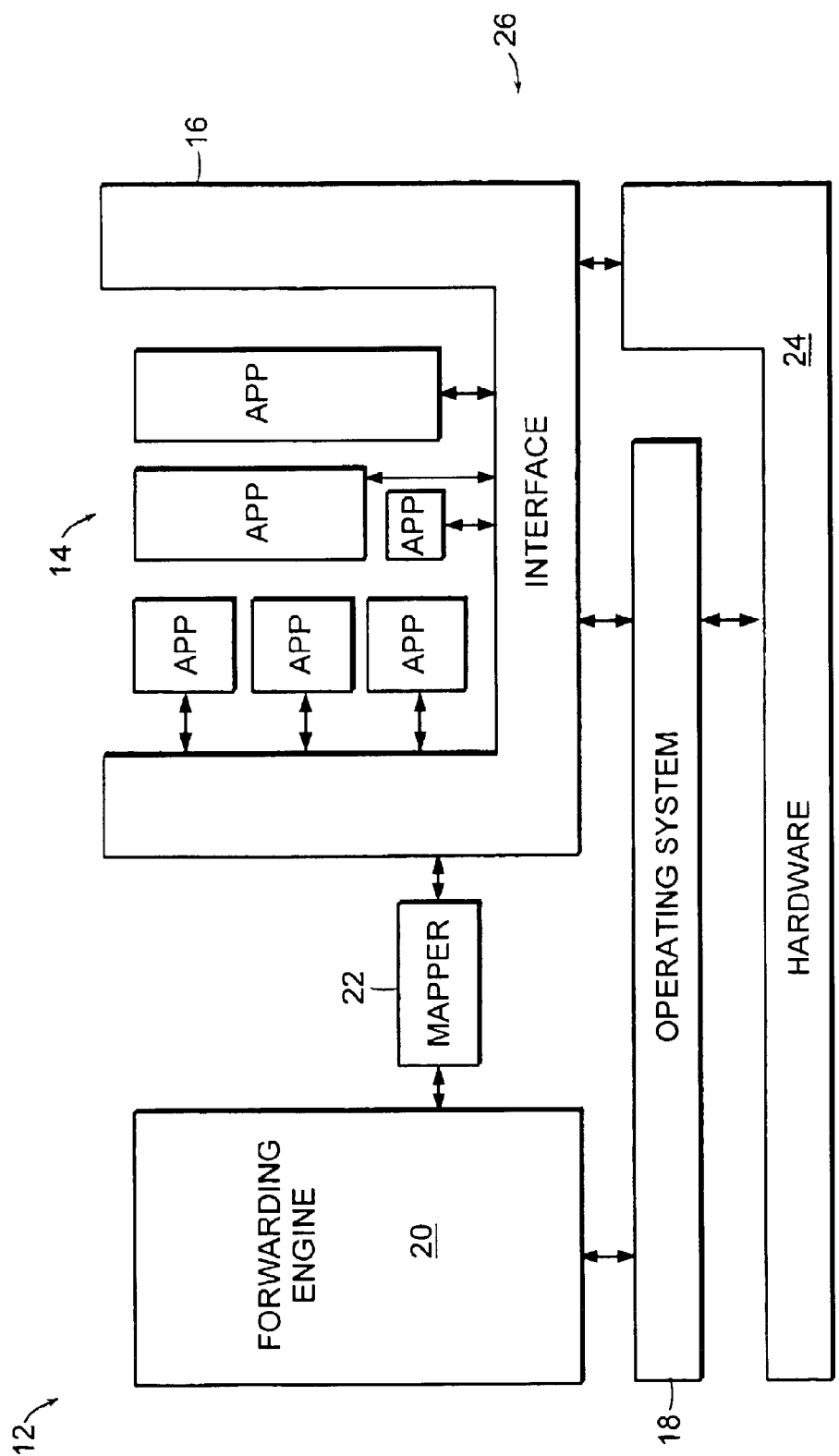
FIG. 2 schematically shows a router configured in accord with preferred embodiments of the invention FIG. 3 schematically shows another representation of the router shown in FIG. 2.

In accord with preferred embodiments, routing application programs (a/k/a "routing software") intended for use within a plurality of disparate routing hardware platforms are configured to produce messages that comply with a prescribed standard routing application program interface ("routing API 16", see FIG. 2). More particularly, routing software (e.g., implementing IP or ATM) may be written by any software vendor for use on any vendor's routing platform that utilizes the preferred routing API. Accordingly, a single routing application program (i.e., a set of application programs specifying a protocol, and supporting and managing a router utilizing the specific routing protocol) may be loaded into any such vendor's routing platform without the need for it to be specifically configured to the underlying routing platform. To that end, as suggested above, the routing software generates command and data messages that are forwarded to the router API. Each received message is formatted in accord with a preselected standard that is recognizable by the router API. Upon receipt, the router API translates each received standard command into platform specific commands that control the underlying routing platform. As discussed in detail below, in addition to its noted platform translation function, the routing API performs many other functions that enhance the operation and performance of its underlying routing platform.

FIG. 2 schematically shows a router 12 configured in accord with preferred embodiments of the invention. The router 12 includes a plurality of routing application programs 14, a single routing API 16 that translates standard commands from the application programs 14 to platform specific commands, an operating system 18, a forwarding engine (referred to herein as the "forwarding plane 20") for forwarding messages, a mapper 22 that interfaces the routing API 16 with the forwarding plane 20, and routing hardware 24 (e.g., memory, drives, processors, ports, etc . . . ). Each of these elements of the router 12 communicate via the shown arrows. Accordingly, the interface communicates directly with the application programs 14, the mapper 22, the operating system 18, and the hardware 24.

In preferred embodiments, the application programs 14 and routing API 16 are considered to be in the "control plane 26" (a/k/a the "control engine 26") of the router 12. As is known in the art, the control plane 26 includes upper layer software used for a variety of functions, such as router calculation, signaling, and management. In general, the control plane 26 controls the forwarding plane 20 by configuring it upon initialization, and updating it as necessary after initialization. For example, the control plane 26 may initialize a routing table that is accessed by the forwarding plane 20 for forwarding data messages. There are instances, however, when the control plane 26 performs functions normally performed by the forwarding plane 20. For example, data messages that the forwarding plane 20 cannot process may be sent to the control engine for forwarding.

The forwarding plane 20 preferably is the lower-layer forwarding path that is responsible for packet inspection, destination lookup, output delivery, and statistics gathering in the router 12. In some embodiments, the forwarding plane 20 is a combination of application specific integrated circuits ("ASICs") and low-level software designed for a specific platform (e.g., firmware). Examples of forwarding plane functions include layer-2/layer-3 hardware assisted lookup functions, queuing systems, and switch fabric elements. As discussed above, the mapper 22 enables the routing API 16 to communicate with the forwarding plane 20. For additional details on the mapper 22 and its interface between the routing API 16 and the forwarding plane 20, see, for example, U.S. Provisional Patent Application Ser. No. 60/125,460 entitled "JFWD: CONTROLLING THE FORWARDING PLANE OF SWITCHES AND ROUTERS THROUGH A NEW JAVA API", filed Mar. 26, 1999, and naming Franco Travostino of Arlington, Mass. as the sole inventor, (the disclosure of which is incorporated herein, in its entirety, by reference).

Figure 3:
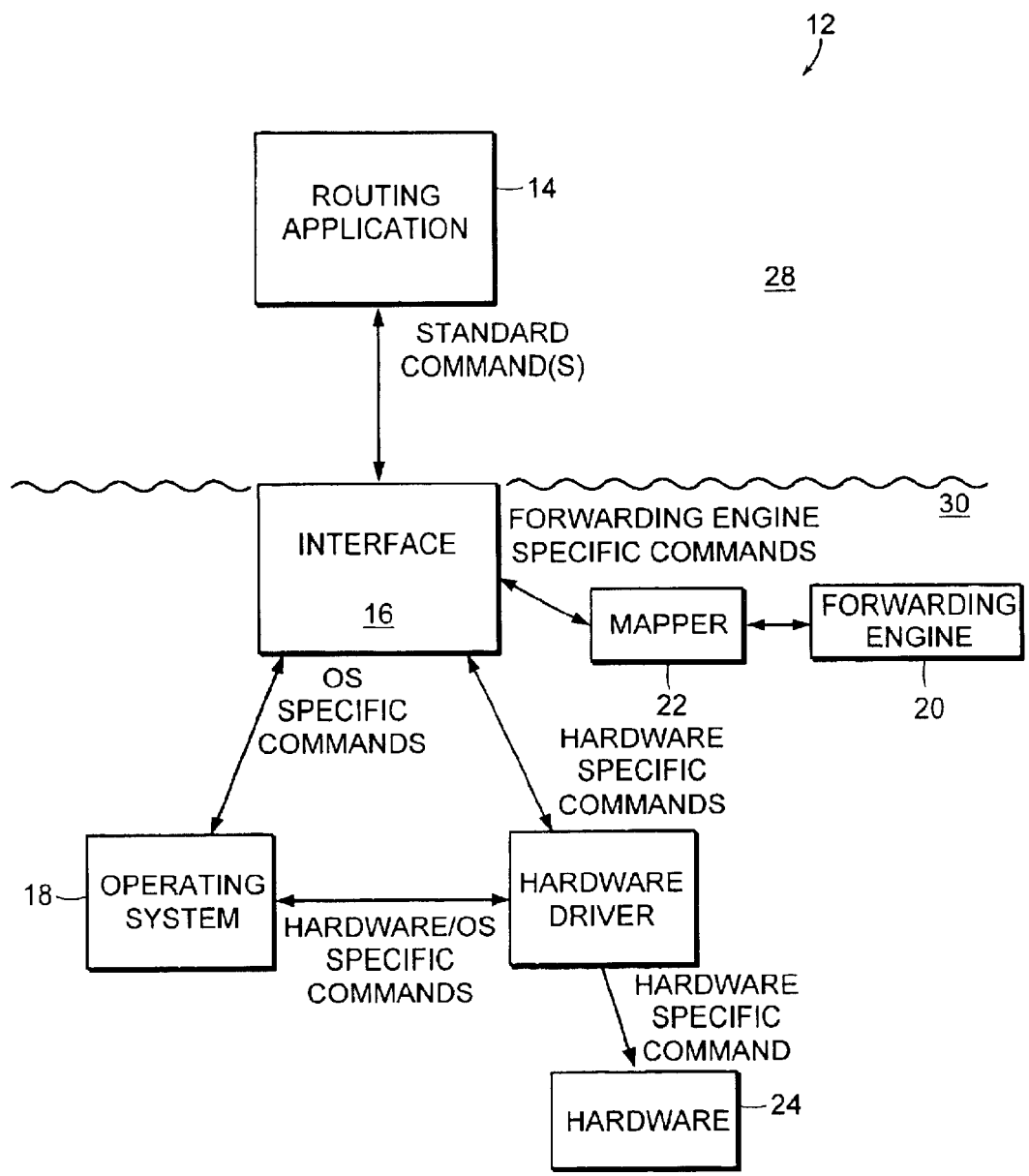

FIG. 3 shows another schematic representation of the router 12 shown in FIG. 2, in which the router 12 is divided into a standard command region 28, and a platform specific region 30. In particular, the application programs 14 forward standard commands to the routing API 16 within the standard command region 28. In response, the routing API 16 forwards router platform specific commands to various parts of the router 12. Specifically, the routing API 16 forwards platform specific commands to the operating system 18 (i.e., operating system specific commands), the hardware drivers, and the mapper 22. The hardware driver and mapper 22 responsively forward further platform specific commands to the hardware 24 and forwarding plane 20, respectively. In a similar manner, the operating system 18 also may forward platform specific commands to the hardware drivers. As discussed in the System Services section below, the routing API 16 is configured for use with any one of a plurality of operating systems 18. Accordingly, the API 16 is customized to receive standard commands from application programs 14, and translate such standard commands (e.g., operating system commands, driver commands, etc . . . ) into the format required by the underlying routing platform.

Figure 4:
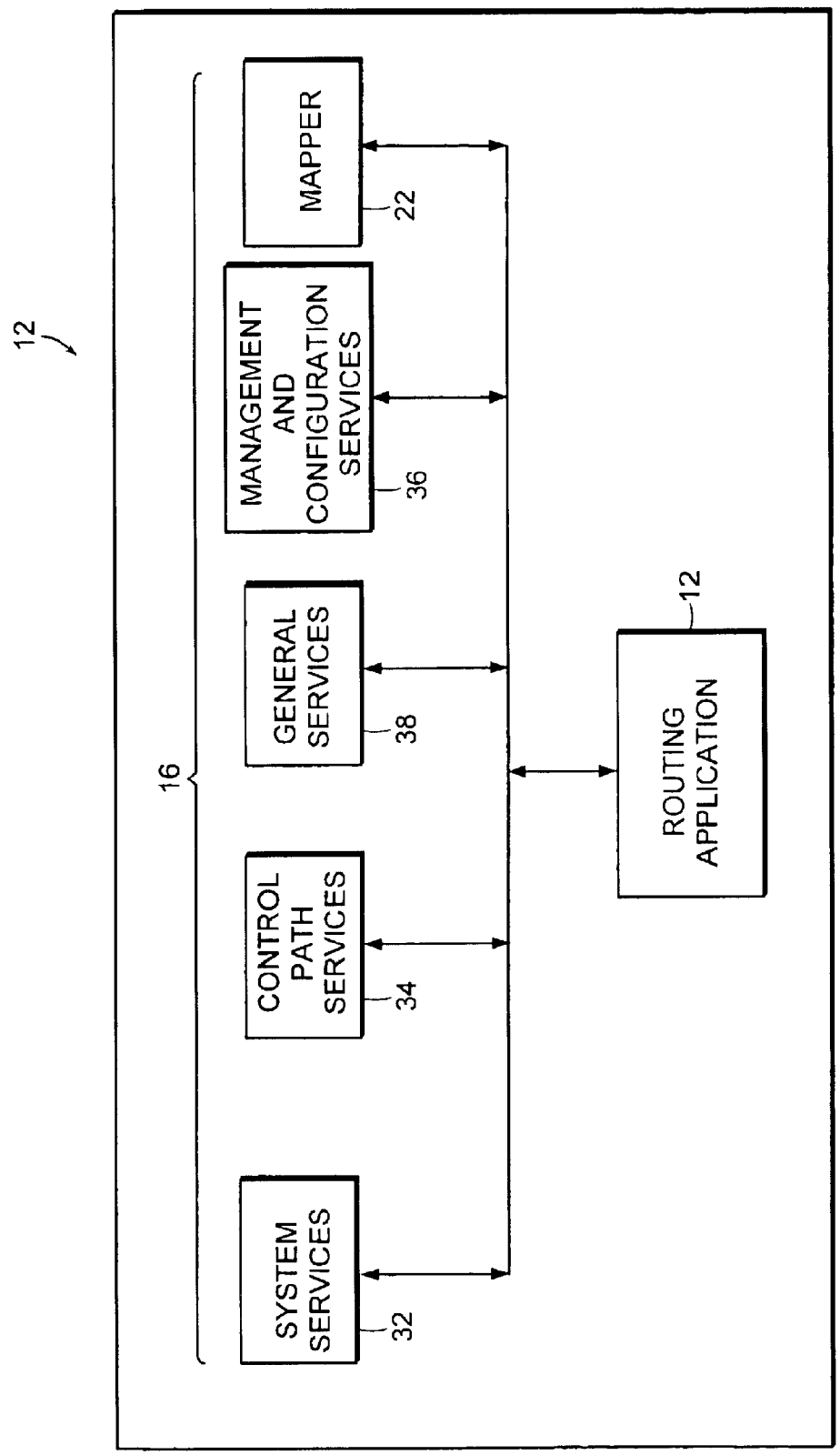
FIG. 4 schematically shows additional details of a routing API and a routing applications configured in accord with preferred embodiments of the invention.

FIG. 4 schematically shows additional details of the routing API 16 and the routing applications 14. In particular, each application program 14 preferably includes each of five specific function libraries. Each such function library preferably is a subset of the functions that comprise the routing API 16. The five function libraries, which are discussed in detail in their separate sections below, include:

- a System Services function library ("System Services API 32") that both interfaces with the operating system 18, and provides low level services;
- a Control Path Services function library ("Control Path API 34") that provides the functionality for inter-application communication;
- a Mapper API that interfaces with forwarding plane 20;
- a Management and Configuration function library ("Management and Configuration API 36") that permits the router 12 to be configured and managed via a management information base ("MIB"); and
- a General Services function library ("General Services API 38") the provides a variety of miscellaneous services, such as error checking and debugging.

Each of the various function libraries cooperates with its underlying application program 14 and the other function libraries to perform the underlying operation of the application program 14 (e.g., routing data messages). As noted above, the application programs 14 may include any known control plane application program 14. In preferred embodiments, such application programs 14 are IP core applications and wide area network ("WAN") core applications. The IP core applications may include an IP stack, a routing table manager, various routing protocols with accompanying APIs, and other software modules necessary to support each of these functions. The WAN core application may include various WAN protocols, such as PPP, frame relay, and ATM. In a manner similar to IP, these protocols may have parts that exist in the forwarding plane 20, and other parts that exist in the control plane 26.

Various application programs 14 that service IP core applications and WAN core applications also may be utilized in the control plane 26. Accordingly, the router platform preferably includes a routing table manager application 49 (in the control plane 26, FIG. 5) that creates and maintains a control plane routing table. As is known in the art, the control plane routing table is a database having information describing a (set of) path(s) 46 to a plurality of network addresses. In addition, the control plane routing table also includes routing protocol information. Among other functions, the routing table manager 49 initializes the routing table, accepts and rejects routing information into and from the control plane routing table, and sorts the records of the routing database based on a keyed field. The routing table manager 49 also synchronizes a forwarding plane routing table (on the forwarding plane 20) with the control plane routing table, as necessary, when updates occur to the control plane routing table. As is known in the art, the forwarding plane routing table is utilized primarily as a look-up table to determine the route that PDUs are to utilize when forwarded to another network device.

The routing table manager 49 accepts both routing information requests and updates from outside routers through a route calculating engine ("RCE"). In a manner similar to the routing table manager 49, the RCE also is an application program 14 executing in the control plane 26. In preferred embodiments, the control plane 26 also includes a routing table API that provides function calls for the RCE to communicate with the routing table manager 49. Such communication may include registering a protocol application program 14 with the router 12, receiving routing information, and deleting routes.

As routing information from different routing protocols is accepted, the routing table manager 49 builds a final control plane routing table. Each routing entry in the control plane routing table preferably contains the route protocol type, the network address/subnet mask pair, the relative route weight, and the address of the next-hop. Based on the routing table entries, the routing table manager 49 can determine the best route for a given destination. This information may be forwarded to the forwarding plane routing table for use in forwarding PDUs. The routing table manager 49 also may rank protocols with an assigned preference value, and then separate this information into an indexed field. Any field that is present in the routing table may be indexed on that field, and an application program 14 (or an RCE) may make an API function call querying on the indexed field information from the routing table. Accordingly, the best route information may be forwarded to the forwarding plane routing table. If such route is not available, then the next best route information may be forwarded to the forwarding plane routing table. Such process may continue until the least best route is forwarded to the forwarding plane routing table.

The routing table manager 49 preferably has a synchronizer that synchronizes all routing table information that is forwarded to the forwarding plane 20 from the routing tables in the control plane 26. The synchronizer contains ARP-like (address resolution protocol) addressing conversion tables. The synchronizer takes the address information that it receives for a data packet and uses addressing conversion tables to convert and merge the information into structures that the forwarding plane 20 may interpret for forwarding data to the correct destination. The synchronizer contains handles to submit and delete forwarding information using the above noted routing table API.

An RCE may make a request to update a route in the control plane routing table. Such request preferably is delivered through a routing table entity thread that is submitted into the forwarding plane 20 of the router 12. The update is received by the synchronizer from the forwarding plane 20, and then forwarded to the routing table manager 49 in the control plane 26. The routing table manager 49 then identifies all similar routes and determines whether the route should be updated in the routing table. If the destination router is already listed within the routing table, the new route and old routes are compared, and the route with the shorter time delay is used in the routing table. Consequently, the route with the longer time may be deleted. If the router is not listed in the routing table, then the route to such router is assigned a rank and added to the appropriate position within the routing table. In addition, an outside router may make a request for a route's deletion or the routing table manager 49 may be notified that a connection has failed. In such case, the router table manager 49 may remove all routes associated with such connection from the control plane routing table In accord with preferred embodiments, the routing table manager 49 indexes the control plane routing table on inter-router communication protocols (i.e., routing protocols). Such protocols may include well known protocols, such as Routing Information Protocol ("RIP"), the Border Gateway Protocol ("BGP"), and the Open Shortest Path First ("OSPF"). Indexing the routing protocol field provides more rapid updates of routing table entries between routers 12 when routing queries are requested for one or more of such type of protocols. It should be noted that although three inter-router communication protocols are noted, any such inter-router communication protocol may be utilized. Accordingly, preferred embodiments are not limited to such three protocols.

Figure 5:
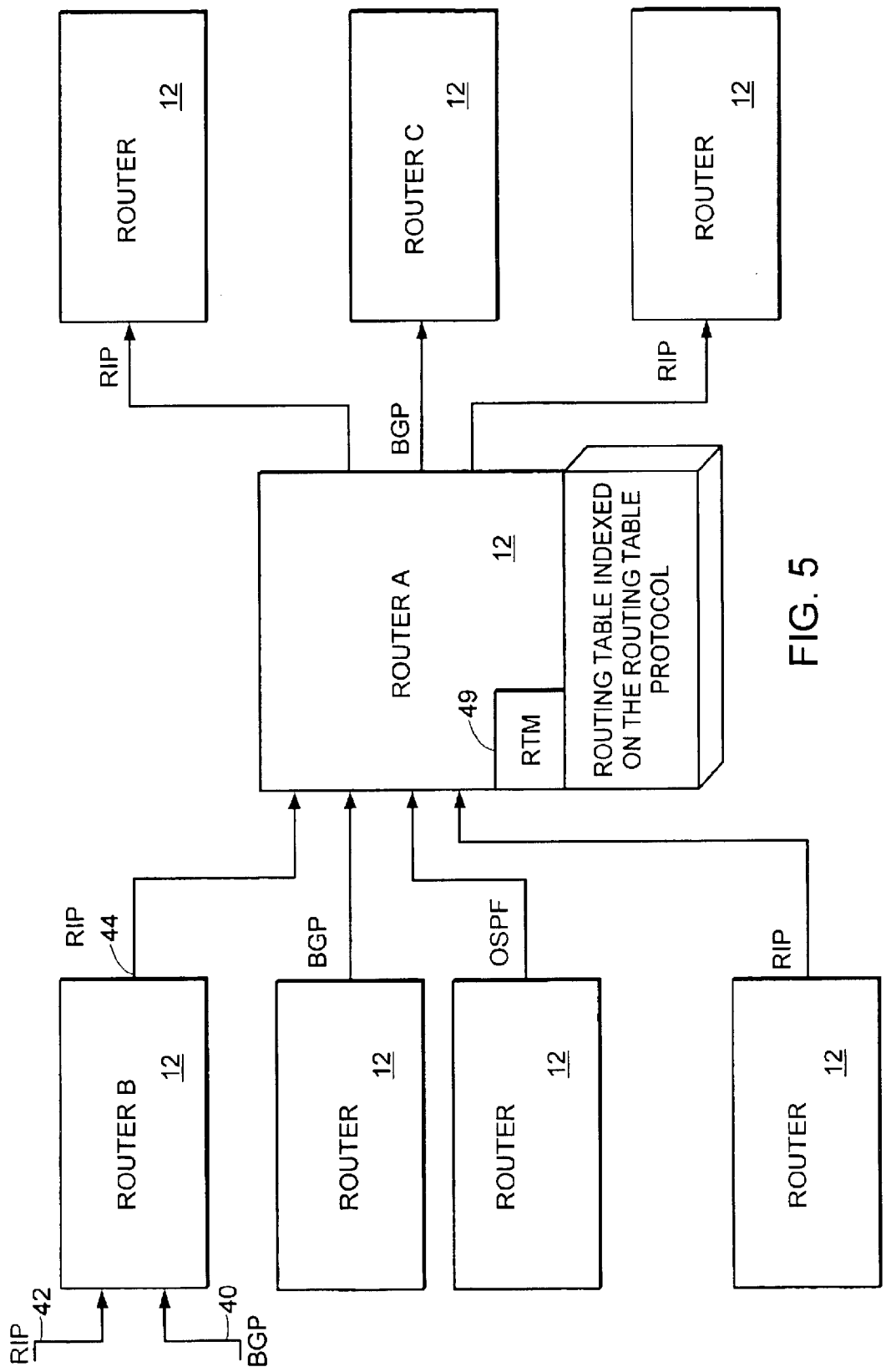
FIG. 5 schematically shows another exemplary network router arrangement in which a plurality of routers are shown to communicate via one or more inter-router communication protocols.

FIG. 5 shows an exemplary network router arrangement in which a plurality of routers 12 are coupled and communicate via the above noted inter-router communication protocols. Specifically, the arrangement includes a router A with seven router ports that each are coupled with a specific router 12. Four of the coupled routers communicate with router A via RIP, two of the coupled routers communicate with router A via BGP, and one communicates with router A via OSPF. In addition to router A, the network router arrangement includes a router B having a BGP interface 40 for communicating with another router (not shown), a first RIP interface 42 for communicating with yet another router (not shown), and a second RIP interface 44 for communicating with router A (via one of the RIP interfaces on router A). The network arrangement also includes a router C that is coupled with router A via one of its BGP interfaces.

Continuing with this example, assume that the RIP interface 42 of router B fails (i.e., the interface that does not couple with router A fails). In addition, assume that the BGP interface 40 of router B also fails. Router B thus updates its routing tables (recording the failure of interfaces 40 and 42), and then signals router A that its routing table(s) should be updated. The routing table manager 49 of router A responsively updates its routing table(s). Further assume, however, that router C is concerned with RIP interfaces only. Accordingly, the router tables in router C require an update of RIP interfaces only. Router C thus signals router A through the BGP protocol, requesting RIP updates only. Because the control plane router table in router A is indexed on routing protocols, the routing table manager 49 of router A may quickly examine the RIP associated records only, and determine the changes that have occurred since an update was last forwarded to router C. Using this technique, the routing table manager 49 of router A is not required to search all of the records in the routing table, thus providing the update to router C more rapidly. Router A consequently forwards a message in BGP format to router C regarding the failed RIP interface 42 of router B.

As suggested above, the control plane routing table preferably is utilized to update other routers and the forwarding plane routing table, while the forwarding plane routing table is utilized to route PDUs. In preferred embodiments, the control path routing table is indexed by creating one linked list for each indexed protocol. For example, router A 12 in FIG. 5 includes a BGP linked list with BGP entries, a OSPF linked list for OSPF entries, and a RIP linked list for RIP entries. In preferred embodiments, all linked lists are maintained by the routing table manager 49 within the control plane routing table. To that end, each entry in the control plane routing table include an additional pointer field that points to another entry in its given protocol linked list. In addition, in accord with conventional programming techniques, the routing table manager 49 maintains global head and tail variables for each protocol linked list. Accordingly, when access to a specific protocol linked list is required, the head of such linked list is located (to locate the first entry), and each entry in the linked list thus is located based upon the respective pointer fields. A given protocol linked list is determined to be fully traversed when its tail entry is located (based upon the tail variable for that linked list).

Below are five sections that each describe one of the five function libraries utilized in accord with preferred embodiments of the invention. The five function libraries together form an overall framework (i.e., the routing API 16) that standardizes communication between the underlying platform and control plane application programs 14.

Control Path Services Function Library

As noted above, the Control Path Services function library ("Control Path API 34") provides the functionality necessary for inter-application communication. The application programs 14 may be any application (e.g., a thread or process) executing on a given routing platform, such as a driver program, a terminating program (e.g., SNMP), a router configuration program, a routing program (e.g., an IP routing program), a protocol stack, or a router table management application (discussed above). To that end, the Control Path API 34 includes a set of communication functions in a function library, and various rules detailing the communication responsibilities of an application program 14. Application programs 14 communicate by passing either control messages or data messages to other application programs 14 on the given platform. Control messages include control requests and replies exchanged between adjacent application programs 14, while data messages include packet data units ("PDUs") that are relayed between application programs 14.

Figure 6:
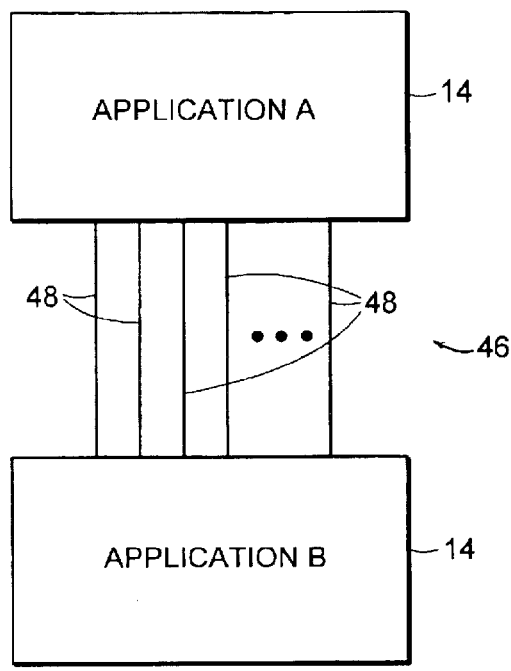
FIG. 6 schematically shows a path and various channels between two communicating applications.

In accord with preferred embodiments, each application program 14 communicates by establishing a path 46 between it and each of one or more application programs 14 (see FIG. 6). Each path 46 may include one or more channels 48 that provide a further data refinement of the path 46. Application programs 14 therefore transmit messages to adjacent application programs 14 via paths 46 and their accompanying channels 48. In preferred embodiments, each channel 48 is preconfigured to carry a specified type of message. Each application program 14 coupled to a given channel 48 thus forwards the specified type of data across such channel 48. Accordingly, messages received via a given channel 48 do not require header information identifying it as a specific type of message.

Figure 7A:
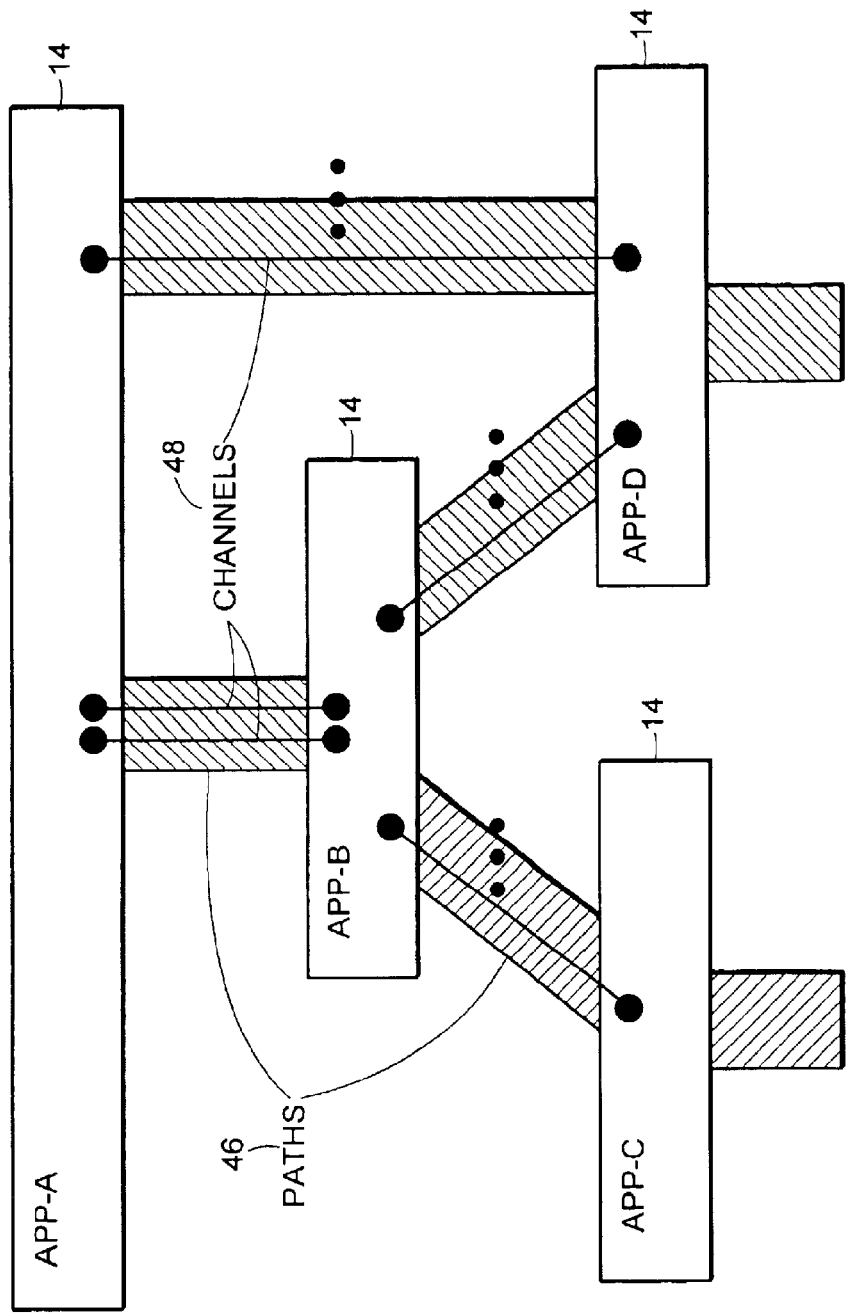
FIG. 7A schematically shows paths and channels between multiple communicating applications.

As shown in FIG. 7A, paths 46 may be established between multiple application programs 14. For example, application-B has a path 46 to application A, a path 46 to application C, and a path 46 to application D. Each of the paths 46 is independently configured to transport specific data to and from the specified applications. Application A may be considered to be at a higher level than application B and thus, may be considered "upstream." Such upstream application may be a router application. Applications C and D, however, are considered to be at a lower level than application B and thus, may be considered to be "downstream." Such downstream applications may be low level driver applications, such as a driver that controls a specific router port.

Figure 7B:
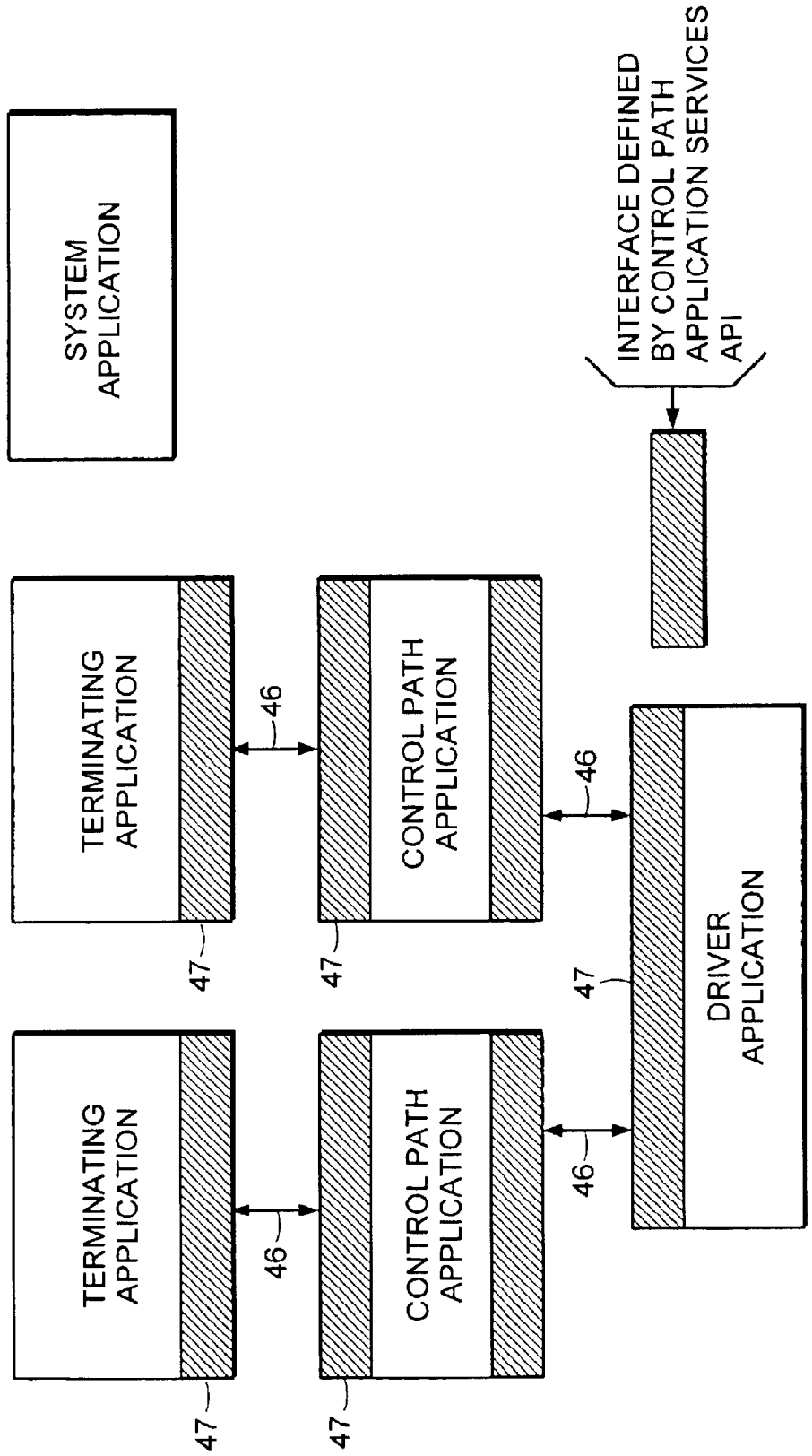
FIG. 7B schematically shows additional details of the applications shown in FIG. 7A.

FIG. 7B schematically shows additional details of the applications shown in FIG. 7A. Specifically, FIG. 7B shows an exemplary pair of control path applications that each are coupled to an upstream terminating application (via a path 46), and a downstream driver application. Each application has an interface 47 defined by the Control Path Services function library. A system application (discussed below in the System Services section) also may be included.

The driver application may be any driver application, such as an interface driver or a disk drive. Of primary importance is that driver applications provide a uniform interface to the underlying platform via interface 47. The terminating applications may be any application that receives messages but does not forward received messages (i.e., applications that consume or produce PDUs). For example, a terminating application may receive a message requesting data, retrieve such requested data, and forward a reply message with the requested data. Examplary terminating applications include a routing protocol (referred to herein as "inter-router protocols", such as RIP), or the well known the Simple Network Management Protocol (discussed below).

Control path applications, as discussed in greater detail herein, may be any application that forwards received messages. More particularly, control path applications generally pass PDUs to other applications. For example, transport protocol applications, such as the well known IP stack, IP applications, TCP applications, and other similar applications may be control path applications. In addition, the router table manager 49 also may be a control path application.

Figure 7C:
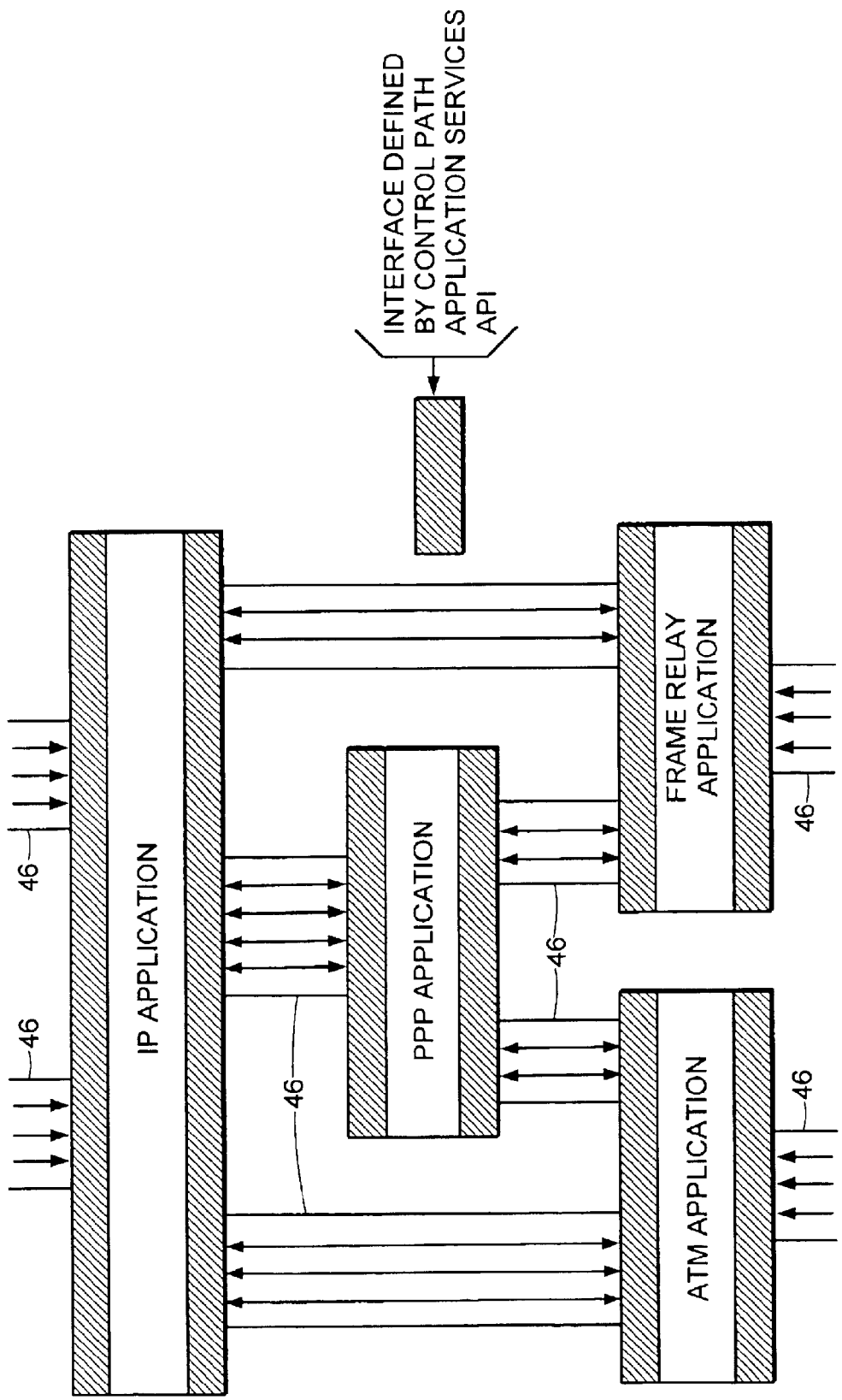
FIG. 7C shows an example of various control path applications that are stacked in an arbitrary order.

In preferred embodiments, protocols may be stacked in any arbitrary configuration. To that end, each control path application should present a uniform interface (i.e., interface 47) to other applications. This interface 47, as discussed herein and shown in FIG. 7B, is provided by the Control Path Services Function Library. FIG. 7C shows an example of various control path applications that are stacked in an arbitrary order. This example shows four control path applications (i.e., IP, PPP, ATM, and Frame Relay). In this configuration, there are nine configured IP interfaces. Specifically, three are IP directly over ATM, four are IP over PPP, and two are IP directly over frame relay. There also are four PPP interfaces (i.e., two configured on ATM and two configured on frame relay). Since all control path applications support the Control Path Application Services API, IP can create IP interfaces with the three different layer-2 protocols in the same manner.

Path identifiers preferably are utilized to uniquely identify paths 46 and types of paths 46. Accordingly, each application program 14 preferably must identify at least one path identifier prior to transmitting a message to an adjacent application program 14. Although many application programs 14 have only one path type, path identifiers identify different path types. For example, the path identifier can be used to differentiate multiple paths between two adjacent application programs 14. Path identifiers typically are utilized when requesting that a path 46 be opened, and when processing a dynamic path request (discussed below). In a similar manner, channel identifiers are used to identify channel connection types. Application programs 14 can generate different channel connection types that may be identified by their channel identifiers.

In preferred embodiments, the Control Path API 34 is asynchronous and thus, utilizes events to control the execution of an application program 14. More specifically, each application program 14 is configured to associate each event in a set of events with one or more event handlers (i.e., functions that execute in response to an event). Such association process, referred to herein as "registering an event", enables specific events (identified in a message) to automatically cause an associated function to execute. Stated another way, receipt of a specific event in a message automatically causes an associated function to execute. Each event and corresponding event handler is application specific and is stored in a data storage device, such as within a handler configuration file in nonvolatile memory. In preferred embodiments, event handlers may be assigned to specified channels 48. Accordingly, receipt of a message over a given channel 48 automatically causes an associated event handler to execute. Arguments within the message may be passed to the corresponding event handler to complete execution.

Figure 8:
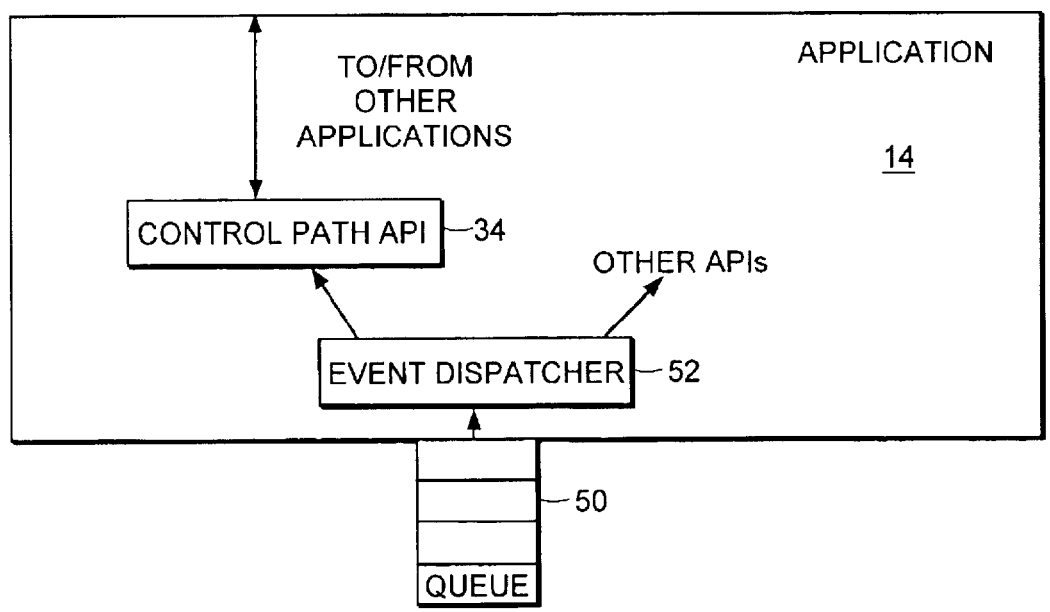
FIG. 8 schematically shows an application with accompanying message queue and event dispatcher.

As shown in FIG. 8, each application program 14 includes a single message queue 50 (e.g., a first-in, first-out buffer) for receiving messages from other application programs 14, and an event dispatcher 52 that retrieves messages from the message queue 50, determines the specified channel 48 of each message, and then (based upon the channel 48) invokes the appropriate event handler. In preferred embodiments, the message queue 50 and event dispatcher 52 are implemented as a part of the System Services API 32. When a message is retrieved from the message queue 50 of a given application program 14, its channel 48 is determined from message opcode within a control field of the message. In other embodiments, the event dispatcher 52 determines the event, and then executes the appropriate event handler. Additional details of the message queue 50 and event dispatcher 52 are discussed below in the System Services API section.

There may be various types of events, such as the following types:

Path control events that maintain the path 46 and notify the application program 14 of the state of specified path 46;

Channel control events associated with specific channels 48, where such events maintain their respective channel 48, indicate channel status and events for requesting and replying to queries;

Dynamic connection events that are generated when an application program 14 requests establishment of a dynamic connection with a target application program 14;

Data events that are generated when a message PDU is received on a connection;

Command events that are generated when a command message is received from an adjacent application program 14 to permit the exchange of application specific commands and responses;

Unknown events generated when no event handler has been registered to receive an event.

The Control Path API 34 utilizes a plurality of standardized function calls (a/k/a functions or commands) to initialize and control the paths 46 and channels 48 between application programs 14. Those standardized function calls are called (i.e., initiated) by application programs 14 within the standard command region 28 (FIG. 3). Such function calls cause the Control Path API 34 within the platform specific region 30 (FIG. 3) to transmit messages in accord with the architecture of the underlying platform. Preferred Control Path API function calls may include the following:

| | |
|---|---|
| cpi_init( ) | Initialize the Control Path API 34; |
| cpi_path_open( ) | Open a path 46; |
| cpi_path_close( ) | Close a path 46; |
| cpi_chanel_open( ) | Open a channel 48; |
| cpi_channel_close( ) | Close a channel 48; |
| cpi_send_command( ) | Send a command message; |
| cpi_send_pdu( ) | Send a PDU message; |
| cpi_register( ) | Modify registered events on a connection. |

Various of these commands are discussed below.

In particularly, the Control Path API 34 must be initialized to permit inter-application communication. Accordingly, prior to using the Control Path API 34, each application program 14 first must initialize its message queue 50, and then initialize its event dispatcher 52. The Control Path API 34 then may be initialized utilizing the cpi_init ( ) command. In response, the Control Path API 34 allocates and initializes resources in preparation for subsequent Control Path API calls. After initialization, the cpi_init ( ) command returns a status message indicating either the success or failure of the initialization process. Among other things, failure to initialize could be due to a system resource problem (e.g., not enough memory), an invalid input argument, or a problem registering with the event dispatcher 52.

Once initialized, each application program 14 can establish paths 46 to adjacent application programs 14. To that end, the cpi_path_open ( ) function is called by a given application program 14 to establish one or more paths 46 to other application programs 14. As a part of that function call, the application program 14 must provide application communication data describing the underlying message transfer mechanism of the path 46 (i.e., the message queue 50), an application path identifier that is unique to a local path 46 to be established, and an adjacent path identifier that uniquely identifies a remote path 46. In addition, the application program 14 also must provide a list of events and corresponding event handling information expected over the given path 46, a context that identifies an environment (e.g., a pointer to an environment, an index to an array, or any other association that permits efficient access), and options that provide different methods for opening the path 46 and defining characteristics of the path 46. Once the path 46 is established, the application program 14 stores a path handler in its environment for use upon subsequent message transfers across the path 46.

A path 46 is not utilized until an adjacent application program 14 is executing. Accordingly, paths 46 are initialized and stored in a path configuration file until the specified application programs 14 begin executing. Once executing, the paths 46 are used as specified in the path configuration file. In preferred embodiments, the paths 46 may be established after initialization ("static paths"), or established upon demand ("dynamic paths").

There are times when path configuration data changes, or when some internal problem prevents communication via a given path 46. In such case, an application program 14 must perform "clean-up" operations to make the path 46 usable again. Specifically, the Control Path API 34 generates a path notify event when it detects a problem communicating via the path 46. The application program 14 may either close the path 46, or restore the path 46 to a usable condition.

A path 46 may be closed by calling the cpi_path_close ( ) command. Issuance of such command closes the path 46 and all its associated channels 48. In preferred embodiments, the entire path 46 is closed. In alternative embodiments, only specified channels 48 are closed. In addition, internal path clean-up preferably is performed when a path 46 is closed. This may include removing handlers associated with the path 46, and freeing memory locations.

As noted above, channels 48 may be established within the path 46 once it is established. Such channels 48, also as previously noted, preferably are associated with specific data messages that are transmitted between application programs 14. An application program 14 opens one or more channels 48 by calling the cpi_channel_open ( ) function. In preferred embodiments, the following information is provided by the application program 14 when calling the cpi_channel_open ( ) function:

| | |
|---|---|
| path_handle: | The handle returned when opening the path 46; |
| my_channel_id: | A unique channel identifier for the channel 48; |
| adjacent_channel_id: | A unique channel identifier for an adjacent application program 14; |
| events: | A list of events expected over this channel 48 with corresponding handler information. When |

-continued

| | |
|---|---|
| | the Control Path API 34 generates an event for this channel 48, it calls the event handler specified in this list; and |
| context: | An argument that is supplied to the event processing functions (i.e., handlers) associated with the channel 48. Among other things, the context can be a pointer to an environment, an index to an array, or other association that permits efficient access. |

Upon return of the cpi_channel_open ( ) function, the application program 14 stores the channel handle in its environment. The channel handle of a given channel 48 thus is supplied in subsequent calls on such channel 48. In preferred embodiments, a channel 48 may be established as a static channel or a dynamic channel. Specifically, channels 48 defined by two adjacent application programs 14 are considered to be static and thus, do not require additional information to be exchanged to permit data flow across such a channel 48. Unique channel identifiers and data identifying messages that are intended to flow over the channel 48 are defined at both ends of each such channel 48. In contrast, dynamic channels (i.e., created on demand) require that additional information be exchanged with the adjacent application program 14 to establish a connection. Such information includes the channel identifiers, and application specific registration data. In preferred embodiments, there are two types of dynamic channels. A first and preferred type, known as a "dynamic non-blocking channel", permits the application programs 14 to process on-going events while the channel 48 is being established. The second type, known as "dynamic blocking channel establishment", require that the channel 48 be established when returning the cpi_channel_open ( ) command. Accordingly, if the open request is successful, the application program 14 can immediately use the channel 48 to send command messages.

Similar to problems associated with paths 46, there are times when channel configuration data changes, or when some internal problem prevents communication via a given channel 48. In such case, an application program 14 may perform "clean-up" operations that restores the channel 48 to a usable condition. Specifically, the Control Path API 34 generates a channel notify event when it detects a problem communicating via the channel 48. The application program 14 may either close the channel 48, or restore the channel 48 to a usable condition. A channel 48 can be closed by calling the cpi_channel_close ( )command. When issuing the close command, the application program 14 provides the channel handle. After a channel 48 is closed, the application programs 14 no longer use the channel handle.

In preferred embodiments, control messages are transmitted to adjacent application programs 14 only and not through an intervening application. Stated another way, control messages are transmitted directly from a transmitting application program to a receiving application program and thus, are not transmitted through any other applications prior to receipt by the receiving application. Conversely, data messages preferably are buffered (e.g., in the queue shown in FIG. 8) and may be transmitted via intervening application programs 14. Accordingly, control messages are transmitted by calling the cpi_send_command function, while data messages are transmitted by calling the cpi_send_pdu_function. Each respective send command transmits a message according to the type of message being sent. Application programs 14 can specify specific channels 48 within a path 46 to transmit messages, or all channels 48 within a path 46. Priorities of transmitted messages also may be specified.

There are times when an application program 14 should determine the status of a channel 48 prior to sending a message. Accordingly, the Control Path API 34 includes a function that enables an application program 14 determine the status of a channel 48 by sending a channel status message. Receipt of a channel status message by an adjacent application program 14 triggers a notification event at such application program 14. The notification event consequently calls a status check handler that determines the status of the channel 48. For example, the channel 48 may be determined to be capable or incapable of transmitting data. The determined status then may be forwarded from the adjacent application program 14 to the requesting application program 14, and stored locally by both application programs 14. If the channel 48 is not functioning, the status message can be forwarded to the requesting application program 14 by some other channel 48.

There are times when an application program 14 should obtain information about other application programs 14 in a chain of application programs 14. To that end, in preferred embodiments, a given application program 14 transmits a query request on a downstream channel 48 to a downstream application program 14. Upon receipt, the downstream application program 14 either sends a response upstream if the requested information is available, or sends a similar query request downstream to gather additional information. In preferred embodiments, a single query request from a given application program 14 returns information relating to each downstream application program 14 in such given application's chain. In alternative embodiments, information relating to upstream application programs 14 also may be determined in a similar manner.

An existing event list and correspond handlers (i.e., the handler configuration file) may be modified when necessary. To that end, the cpi_register ( ) command may be called by an application program 14 to modify an existing event/handler table. Accordingly, events and handlers may be added, changed, or deleted at any time. A return value may be returned indicating if the modification was successful.

Figure 9:
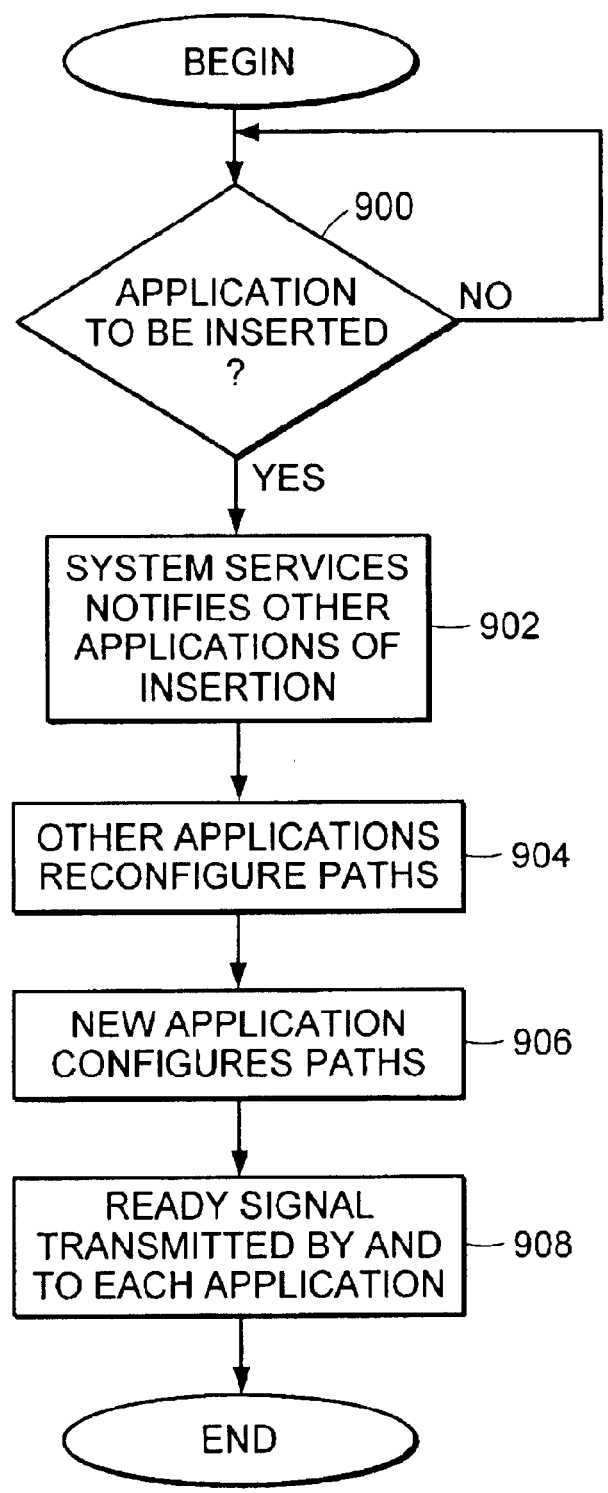
FIG. 9 shows a preferred process of adding a new application to a system with a plurality of running applications.

In accordance with preferred embodiments of the invention, one or more new application programs 14 may be added to a system of already running application programs 14. The new application programs 14 are configured so that when added, each application program 14 independently establishes the necessary paths 46 and channels 48 between the various running application programs 14. No central authority or process is required to establish the specific paths 46 and channels 48. In particular, FIG. 9 shows a preferred process of adding a new application program 14 to a system with a plurality of already running (i.e., initialized) application programs 14. The process begins at step 900 in which it is determined if an application program 14 is to be inserted. When a new application program 14 is to be inserted, the process continues to step 902, in which the new application program 14 notifies the other application programs 14 that it is being inserted. More particularly, the application program 14 calls a notification function in the System Services API 32 (discussed below) that forwards a notification message to each of the other application programs 14 notifying them that the new application program 14 is being inserted. The notification message may include application specific information relating to the new application program 14. In addition, the notification function may return information about the other application programs 14 to the new application program 14.

In alternative embodiments, a monitoring function may monitor the system to determine when the new application program 14 is added. When added, the monitoring function calls the other application programs 14 via a notification message having data indicating that the new application program 14 has been added.

The process then continues to step 904 in which the other application programs 14 reconfigure their paths 46 and channels 48 to connect with the new application program 14. The configuration of the new paths 46 and channels 48 between each of the application programs 14 may be derived based upon the new application information received in the notification message.

In alternative embodiments, the other application programs 14 retrieve path and channel data from a configuration file. Path and channel data may have been added to the configuration file, at an earlier time, by a management and configuration application. For example, a network administrator may configure the system to cause the new application to operate in a specified manner. The management and configuration application responsively determines the appropriate paths and channels to utilize with the new application when it is added to the system. Accordingly, this data is stored in the configuration file and utilized when the new application is added to the system.

The process then continues to step 906 in which the new application program 14 configures paths 46 and channels 48 to the other application programs 14. In a manner similar to the previous step, the configuration of these paths 46 and channels 48 may be based upon the return information about the other application programs 14 received by the new application program 14. In alternative embodiments, the new application program 14 retrieves the appropriate path and channel data from the above noted configuration file. It should be noted that the previous two steps 904 and 906 may be performed in any order, or concurrently.

Once the paths 46 and channels 48 are configured, then the process continues to step 908 in which a ready signal is transmitted by each application program 14. Each of the application programs 14 thus may transmit data via the revised paths 46 and channels 48. Accordingly, subsequent application programs 14 similarly may be added to such group of application programs 14 in a manner similar to that described with respect to FIG. 9.

Figure 10:
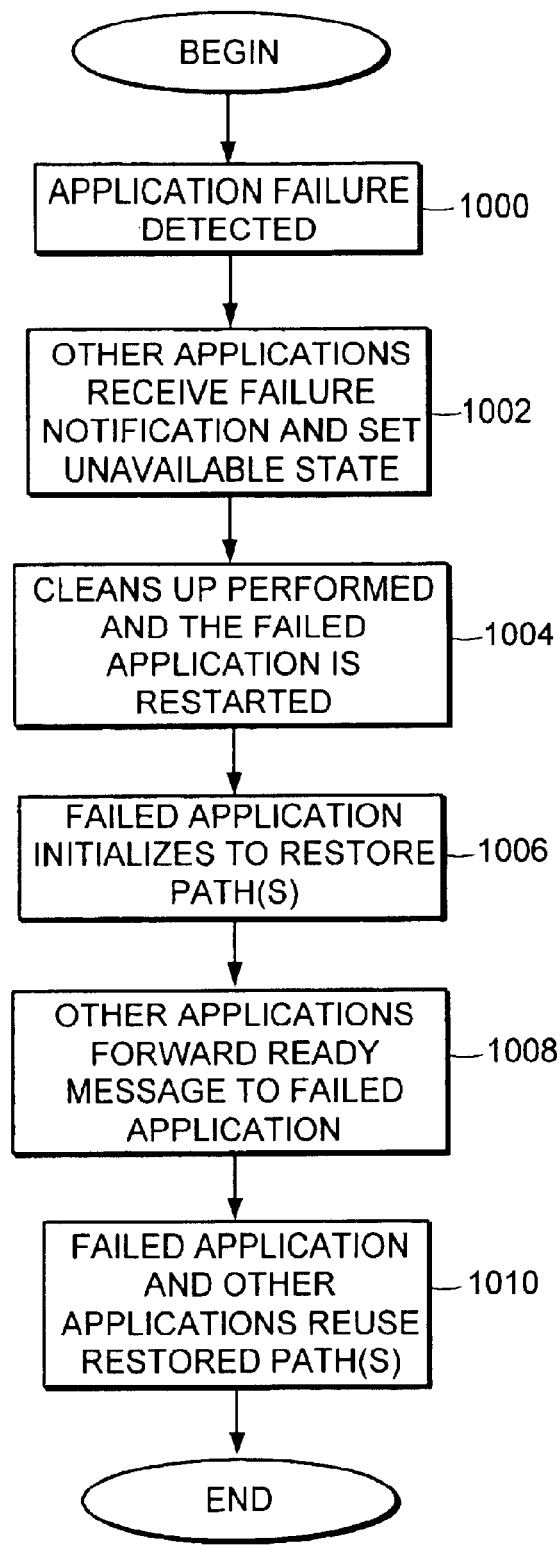
FIG. 10 shows a preferred process of restoring paths when an application has failed FIG. 11 schematically shows an exemplary group of applications that can implement a bypass path.

Accordingly, as described above with reference to FIG. 9, each application program 14 is written so that it may be started at any time and independently connect with already executing application programs 14 on the routing platform. No central authority is necessary to make the necessary connections. In a similar manner, any executing application program 14 may fail and restart without requiring a central authority to reconnect the paths 46 and channels 48. More particularly, FIG. 10 shows a preferred process of restoring paths 46 when an application program 14 has failed. The process begins at step 1000 in which an application program 14 failure is detected (e.g., a software fault or a bus error). In preferred embodiments, each application program 14 is configured to make a function call to a system services failure function that transmits a failure message to other application programs 14 (via a specified channel 48 to each application program 14) when the application program 14 fails. In preferred embodiments, only application programs 14 connected to the failed application program 14 (i.e., via a path 46) receive such message. In other embodiments, a monitoring function in the system services library monitors the application and forwards the failure message to the other relevant applications after the application fails.

Upon receipt of the failure message, each application program 14 sets an unavailable state bit (step 1002) indicating that paths 46 to the failed application program 14 are not usable but will be usable at a later time. In preferred embodiments, the unavailable state bit is a one bit field associated with each path 46 in the path configuration table. Accordingly, when the unavailability state bit of a given path 46 is set, no data is transmitted via that path 46.

The process then continues to step 1004 in which a clean-up function is performed and the failed application program 14 is restarted. In preferred embodiments, the monitoring function restarts the failed application program 14. Once restarted, the failed application program 14 begins to execute its initialization processes (step 1006). More particularly, the failed application program 14 first accesses the configuration table to locate path and channel information. The unavailability state bit then may be reset to zero, thus permitting subsequent data transmission across the various configured paths 46 to other application programs 14.

The other application programs 14 receive notification of the failed application program's initialization and responsively forward a ready message to the failed application program 14 (step 1008). In a similar manner, the failed application program 14 forwards a ready message to each of the other application programs 14. The ready message notifies a receiving application program 14 that the application program 14 transmitting the ready message is ready to receive messages via the path(s) 46 specified in the configuration table. Once all application programs 14 have been notified that the others are ready to receive data, the failed application program 14 and other application programs 14 may utilize the paths 46 to transmit messages (step 1010).

Accordingly, in a manner similar to adding a new application program 14, no central authority is needed to restore the paths 46 and channels 48 for a failed application program 14. As noted above, each application program 14 is configured to restart and independently restore any necessary paths 46 without a central authority, thus demonstrating resiliency to failure. Assuming they have not failed, none of the other applications is restarted. Since all threads are event driven, failure of one of the other threads should not cause other threads to fail unless erroneous event messages are transmitted to the other threads.

Figure 11:
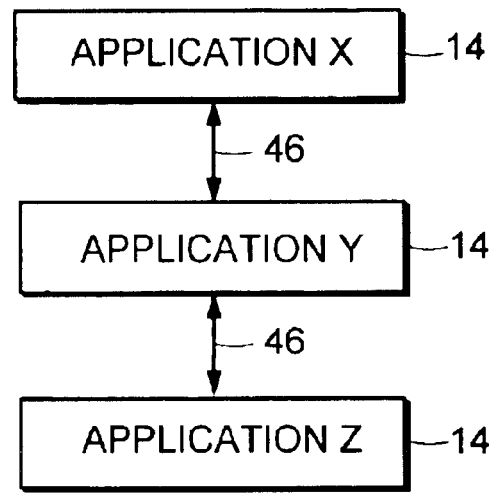

In alternative embodiments of the invention, application programs 14 may bypass an intervening application program 14 to transmit messages directly to another application program 14. FIG. 11 shows an exemplary group of application programs 14 (designated as applications X, Y, and Z, respectively) that can implement a bypass path 54. Specifically, applications X and Y communicate via a first path 46, and applications Y and Z communicate via a second path 46. If necessary, applications X and Z may communicate via intervening application Y. Accordingly, intervening application Y may receive a message from one of the end applications X or Z, and forward it to the other end application X or Z as necessary.

Figure 12:
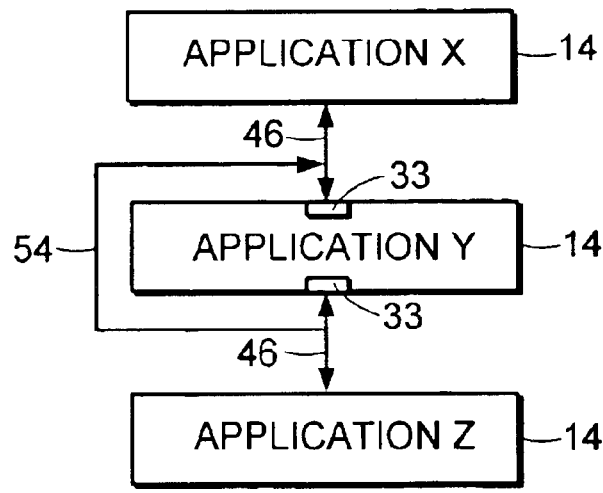
FIG. 12 schematically shows a bypass path formed by the applications shown in FIG. 11.

There are times, however, when a direct communication between applications X and Z facilitates the overall routing process. For example, application Y may be a configuration program that is primarily utilized to initialize application X and/or Z. Once initialized, however, there is little reason for application Y to receive and/or process data messages. Accordingly, in preferred embodiments, a bypass path 54 is initialized by the intervening application Y between applications X and Z. To that end, application Y includes a control path bypass function ("bypass function", shown schematically as reference number 33 in FIG. 12) that receives messages from either of the applications X or Z and forwards them as appropriate. For example, the bypass function 33 of application Y may receive a message from application X and determine that application Y is not to process it. Such bypass function 33 thus forwards the message directly to application Z via the bypass path 54. In some embodiments, the bypass path 54 is a one directional path. In such case, separate bypass paths 54 must be created for messages going in either direction. In other embodiments, the bypass path 54 is a two directional path.

In preferred embodiments, the bypass function 33 is a part of the overall application program interface. Accordingly, each application program utilized with the overall system is written to utilize the bypass function 33 as necessary. Each bypass path 54 preferably is established and utilized in accord with the processes described herein.

System Services Function Library

Figure 13:
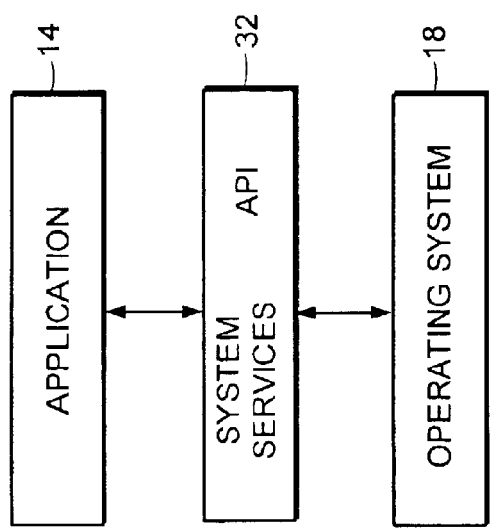
FIG. 13 schematically shows the communication relationship between an application, the System Services API, and an operating system.

As previously noted, the System Services function library ("System Services API 32") acts as an operating system interface that receives standard commands from application programs 14 (e.g., IP routing programs or PPP routing programs) and translates them into a format that is readable (i.e., executable) by the underlying operating system 18 (see FIG. 13). Upon receipt, the operating system processes the translated commands in accord with conventional processes. The System Services API 32 therefore is written according to the operating system 18 controlling the underlying router platform 12. Exemplary operating systems 18 include UNIX (e.g., POSIX), WINDOWS, and DOS. Accordingly, if a DOS operating system 18 is utilized on a given router 12, then the System Services API 32 translates the standard commands to a DOS readable format on that router 12. In a similar manner, if a UNIX operating system 18 is utilized on a given router 12, then the System Services API 32 translates the standard commands to a UNIX readable format on that router 12.

In a manner similar to the other APIs described herein, the System Services API 32 is fault resilient, scalable, and modular. To provide such advantages, the System Services API 32 performs various lower level functions that facilitate router operation. One such function monitors and efficiently manages thread memory usage. Specifically, when an executing thread no longer is executing, its allocated memory segment(s) 66 (FIG. 16) are released and reused by other threads and/or processes utilizing the system. As known in the art, memory utilized by a single thread is shared memory that is shared between threads of a single process. Threads of another process therefore cannot access the memory of a given process.

Figure 14:
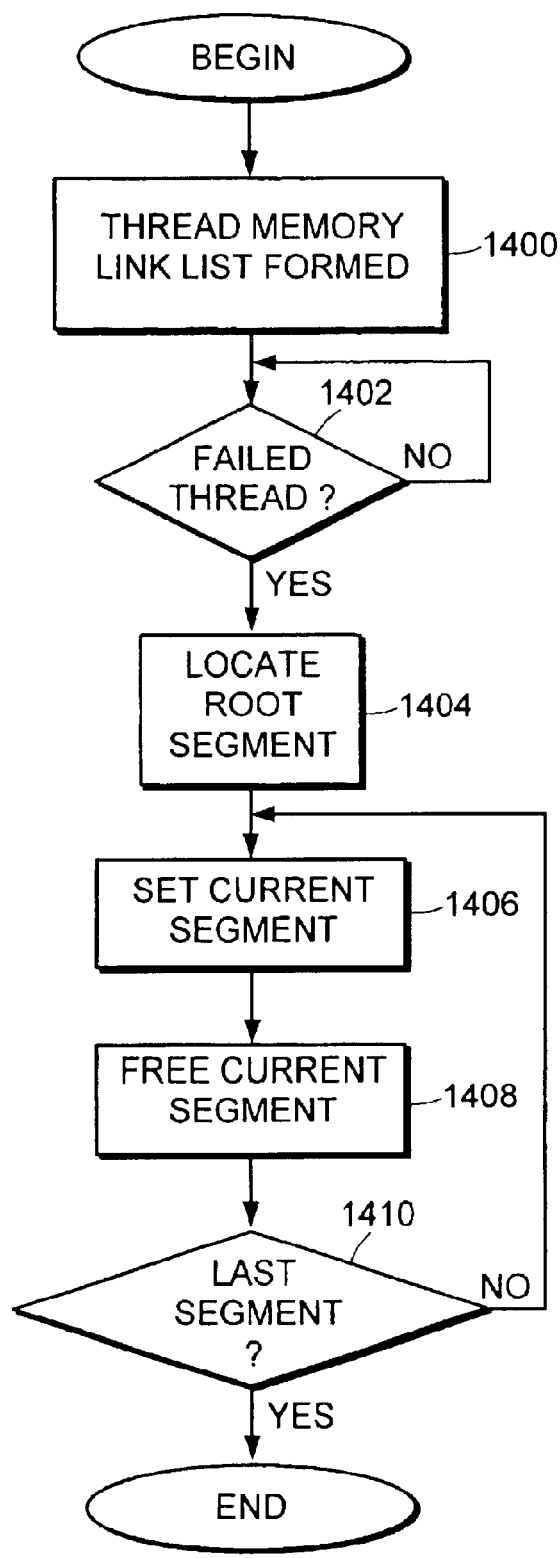
FIG. 14 shows a process utilized by the System Services API for managing thread memory of a single thread in accord with preferred embodiments of the invention.
Figure 15:
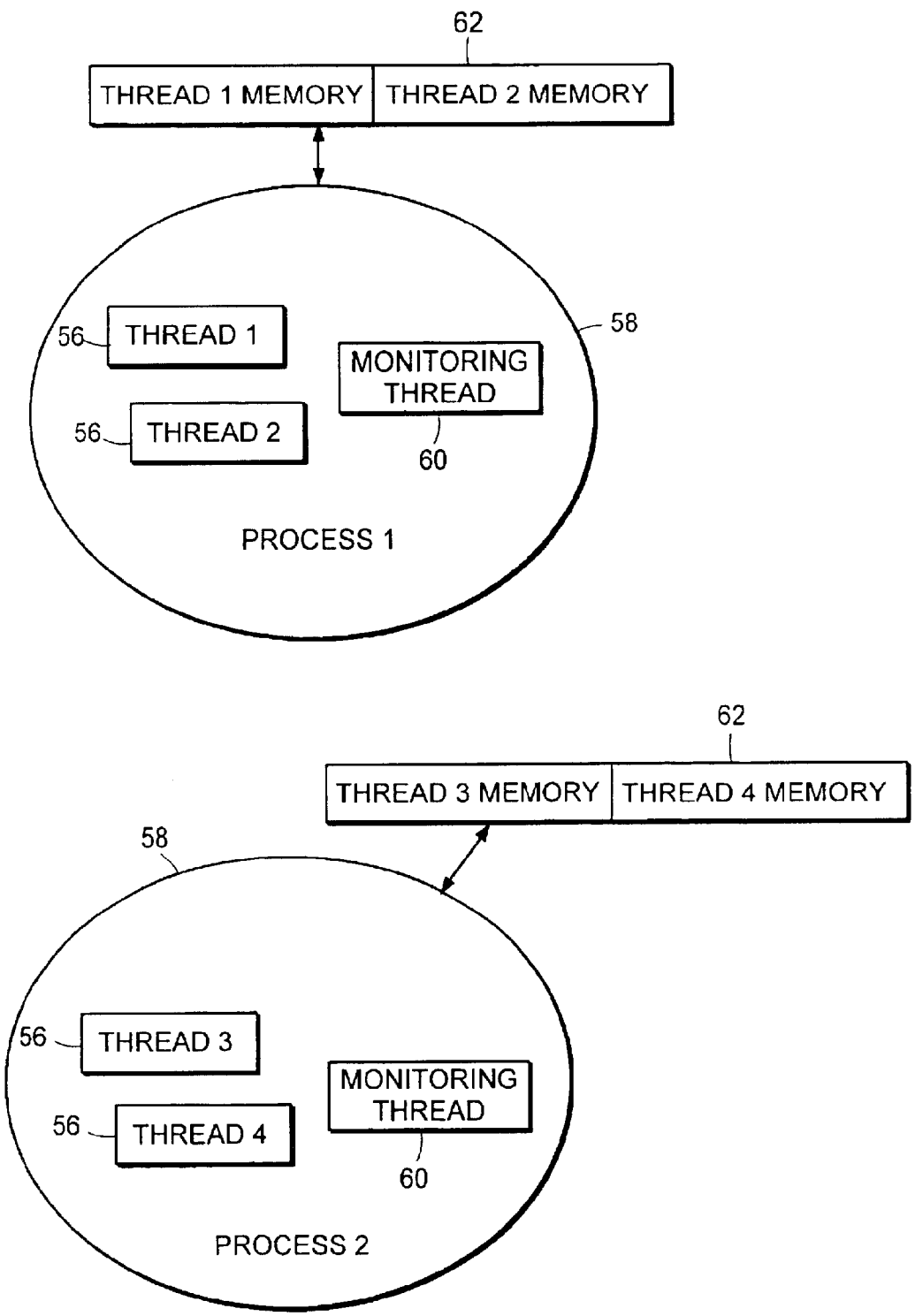
FIG. 15 schematically shows exemplary co-executing processes that each have multiple threads.

FIG. 14 shows a process utilized by the System Services API 32 for managing thread memory of a single thread 56 in accord with preferred embodiments of the invention. As shown in FIG. 15, the thread 56 preferably is one of a plurality of threads 56 executing in a single process 58. Each process 58 thus includes one or more execution threads 56 that each write to one shared memory location 62, and one monitoring thread 60. The execution thread 56 executes the underlying process 58 desired in an application program or process, while the monitoring thread 60 monitors and manages memory usage by the other threads 56.

Figure 16:
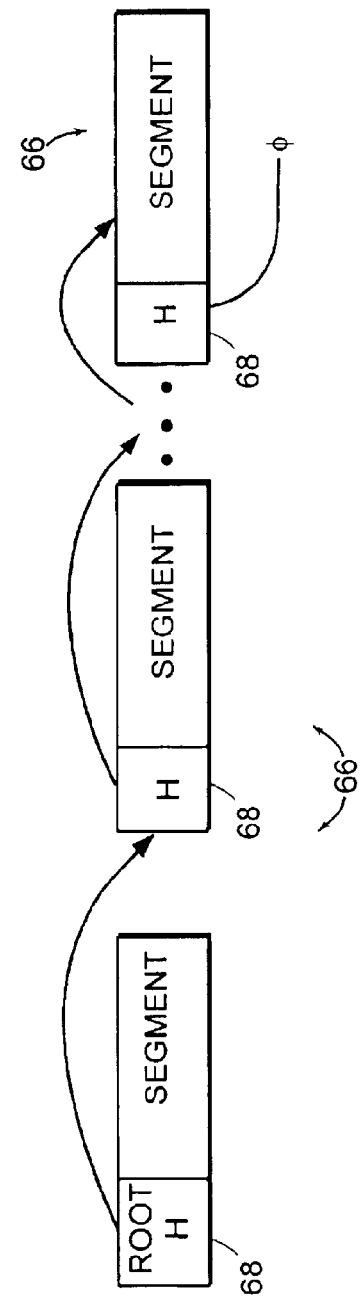
FIG. 16 schematically shows a preferred embodiment of a thread memory link list.

Returning to FIG. 14, the process begins at step 1400 in which a thread memory link list 64 (FIG. 16) is formed for the thread 56. As shown in FIG. 16, the thread memory link list 64 includes one or more memory segments 66 that each have a header 68 pointing to another memory segment 66 for the thread 56. Specifically, the header 68 includes a pointer field that points to a start address in a heap memory (not shown) of a later allocated memory segment 66.

By way of example, the thread 56 may request that a first memory segment 66 of a preselected size be allocated. The operating system 18 responsively locates a first memory segment 66 (having the preselected size) in a root location of the heap memory, and then appends a preselected amount of extra contiguous memory to the front of such first memory segment 66 to act as the header 68. The root location is made available via a global variable to both the thread 56 being monitored, and the monitoring thread 60 (discussed below). Until another memory segment 66 is allocated for the thread 56, the header 68 is set to zero, thus indicating that no other memory segments 66 are in the link list 64. When the thread 56 requests that a second memory segment 66 of a second size be allocated, the operating system 18 again locates another second sized memory segment 66 in heap memory with a header 68. The header 68 of the first memory segment 66 then is set to point to the start address of the second memory segment 66, and the header 68 of the second memory segment 66 is set to zero. When a third memory segment 66 is allocated, the header 68 in the second memory segment 66 is set to point to the third memory segment 66 while the third memory segment header 68 is set to zero. This process continues iteratively as new memory segments 66 are added to the memory link list 64.

It then is determined by the monitoring thread 60 (at step 1402) if the thread 56 has failed. In preferred embodiments, the monitoring thread 60 determines that a thread 56 has failed when it receives a failure event message from the operating system 18. In other embodiments, the monitoring thread 60 polls each thread 56 to determine if it failed (i.e., not operating). A thread 56 may be deemed to fail when it stops executing, corrupts data and/or other thread execution, or does not execute its designated function. Each of these conditions often are referred to as a "crash" condition.

If the thread 56 is determined to have failed, then the process continues to step 1404 in which the monitoring thread 60 accesses the root variable to determine the address of the first (root) memory segment 66 of the thread 56. Once the first memory segment 66 is located, a current segment variable is set to be the first memory segment 66 (step 1406). The monitoring thread 60 then locates the first current segment (i.e., the first memory segment 66), reads the header 68 to determine the next memory segment 66, and then executes a "free" command that removes the memory from the memory list (step 1408). Such removed memory segment 66 (and header 68) then can be utilized by other processes and/or threads 60.

It then is determined at step 1410 if the current segment is the last segment. To that end, if the data read from the header 68 in the current memory segment 66 is set to zero, then the current segment is the last memory segment 66, thus ending the process. Conversely, if such header data includes an address in the heap memory, then the current memory segment 66 is not the last memory segment 66. In such case, the process loops back to step 1406, in which the current segment variable is set to the memory segment 66 located at the address specified in the prior noted header 68. The process continues in this manner until the last memory segment 66 is freed for use by other threads 56 and/or processes. It should be noted that the thread 56 may be restarted in accord with the process shown in FIG. 10.

In preferred embodiments, the monitoring thread 60 executes the process 58 shown in FIG. 14 by intercepting memory request messages from the process/thread 58, 56 to the operating system. To that end, the process forwards a memory request message to the operating system requesting that memory be allocated for one or more of its threads 56.

The monitoring thread 60 receives (i.e, intercepts) such message and then forwards it to the operating system. The operating system responsively allocates the necessary thread memory and forwards a reply message (with the location of the allocated memory for the thread(s)) back to the monitoring thread 60. The operating forwards the reply message to the monitoring thread 60 because to the operating system, such thread 60 forwarded the memory request message. The operating system has no data suggesting that the process 58 forwarded the request. The monitoring thread 60 then stores the memory locations allocated by the operating system, and then forwards the reply message to the process 58. The process 58 thus reads the reply message and utilizes the memory locations noted in the reply message. As noted above, when a monitored thread fails, the monitoring thread 60 retrieves the location of the memory segment for the failed thread, and frees it as noted in the above noted process of FIG. 14 (e.g., via a release message to the operating system). Accordingly, since the monitoring thread 60 intercepts messages between the process and operating system, any type of operating system may be utilized. Neither the process, nor the operating system, therefore needs to be specially written to provide the memory reclamation function.

As noted above in the Control Path function library section, the message queue 50 and event dispatcher 52 (shown in FIG. 8) preferably at least in part are implemented by the System Services API 32. Accordingly, in preferred embodiments, the message queue 50 is a software queue having dispersed memory segments 66. In preferred embodiments, the message queue 50 receives messages having varying priorities. For example, messages may be assigned a priority of one, two, or three, where messages with a priority of one have the highest priority, and messages with a priority of three have the lowest priority. The message queue 50 of such a system therefore includes a single software FIFO queue for each message type. The three software FIFOs thus are considered to be a single software message queue 50. Accordingly, messages are retrieved from the priority one message queue 50 first. When such queue is empty, messages are retrieved from the priority two message queue 50. When both the priority one and two queues are empty, messages are retrieved from the priority three message queue 50. Accordingly, as a general rule, if any higher priority queue has a message while a lower priority queue is being read, the application program 14 stops reading from the lower priority queue to read from the higher priority queue.

The event dispatcher 52, as noted above, retrieves messages from the message queue 50, and then disperses the messages to the specified function or thread 56 within the application program 14. In preferred embodiments, the event dispatcher 52 permits functions within any of the various function libraries to register for specific types of messages. For example, a control path function may register with the event dispatcher 52 to receive messages of a given type. Accordingly, each message of the given type retrieved from the message queue 50 by the event dispatcher 52 is forwarded to the control path function. Since the actual processes 58 and/or threads 56 of the application program 14 that perform the underlying application function do not receive such messages, changes to the control path function (for example) do not require that the application program 14 be reconfigured.

An application program 14 utilizing an event dispatcher 52 first must initialize the event dispatcher 52 by calling an event dispatcher initialization function in the System Services API 32. In preferred embodiments, such function utilizes the queue message handle, an idle function pointer, and a default function pointer. Once initialized, event handlers are registered utilizing a function call to an event registration function in the System Services API 32. Upon receipt by the event dispatcher 52 of a message with a specified event, the specified handler function is called with accompanying arguments. The handler then is set to its duty loop, thus executing its underlying function.

In preferred embodiments, the System Services API 32 supports a file system that is available with conventionally known POSIX calls to conventional POSIX functions, such as open, close, read, and write. Such functions preferably execute as threads 56 that utilize remote procedure calls to interact with the application programs 14 via their respective message queues 52. Accordingly, in the event that the file system thread 56 fails (i.e., one or more of the threads 56 fails), each failed thread 56 should restart without disabling either the entire router system or application program(s) 14.

Management and Configuration Function Library

In accordance with preferred embodiments of the invention, the Management and Configuration function library ("M&C API 36") permits the router 12 to be configured and managed via a single management information base ("MIB") having a plurality of MIB units. The MIB preferably includes a plurality of MIB units organized into MIB records. Each MIB record is utilized to maintain either configuration data, or management data. It should be noted, however, that although they are stored in one MIB structure, both configuration and management data have different functions on a router platform. More particularly, as known in the art, configuration data is used to provision items in the platform (e.g., create, define, and delete). Management data, however, is used to monitor and/or control items on the platform and typically is utilized by a system administrator. As discussed in greater detail below, management data preferably is stored in conventional MIB units, while configuration data preferably is stored in specialized configuration MIB units that are specific to the underlying platform and applications 14.

Since MIB units are utilized for both configuration and management data, a system administrator may access each MIB unit in the same manner, regardless of the type of data stored in it. Accordingly, only a single set of interfacing commands and processes is required to access such data. Moreover, a plurality of interfaces may be utilized by the system administrator to access and process the MIB units. Details of the MIB database and management and configuration processes are discussed below.

In preferred embodiments, the MIB includes a plurality of managed objects for monitoring and controlling specific portions of the platform. The content of each MIB unit may be specified by application specific standard MIB branches defined by the Internet Engineering Task Force ("IETF") Request For Comments ("RFC"). In addition, the platform may define proprietary extensions to the standard MIB units, or completely new branches. For example, one branch may include management MIB units, while another branch may include configuration MIB units. Each branch includes attributes, some of which may be instantiated, modified, deleted or configured to be read only. Remote management application programs 14 (noted below) manage the platform by reading and manipulating such attributes.

The router platform preferably utilizes the well known the Simple Network Management Protocol ("SNMP") to control management processes via the MIB. One such implementation preferably is distributed under the trade name "EMANATE", distributed by SNMP Research International, Inc. of Knoxville, Tenn. As known in the art, EMANATE operates in conjunction with a management agent to support remote management operations (e.g., via a remote location) through the SNMP protocol.

Application programs 14 may be developed to provide basic methods for manipulating the object families. To that end, tools provided by EMANATE are utilized to generate much of the code, labels, and structures to support the MIB. Specifically, EMANATE includes a master agent and many subagents for controlling the MIB. The master agent performs many of the SNMP protocol functions, such as authorization, authentication, access control, and privacy. Other functions of the master agent may include fetching and setting managed object attributes. Each subagent is responsible for managing one or more object families (i.e., branches or records that comprise one or more MIB units). Accordingly, when the master agent receives an SNMP request to get or set (discussed below) the value of a managed object, it first determines which of the subagents manages the object of interest, and then instructs such subagent to fulfill the request. The master agent then sends the reply to the requester via SNMP.

In accord with preferred embodiments, each subagent controls each of its object families via six known commands (functions). Those commands are "get", "set", "test", "ready", "undo", "default." The "get" command returns the current value of the family's object, or the default values of such object. It also can advance to the next instance of a particular object. The "set" command sets the objects to given values, such as the current state of the application program 14. The "test" and "ready" commands validate new values to be set. The "default" command returns the default values within a record. The "undo" command reverses the effect of the most recent "set" command. Each object in the MIB includes methods that correspond with these six common commands.

MIB sources preferably are written using SMI v.2 syntax, described at IETF RFC 1442–1445. Although not preferred, the EMANATE MIB compilers also support SMI v. 1, described in IETF RFC 1115. In preferred embodiments, the overall MIB comprises standard MIB units, proprietary MIB units, and configuration MIB units. Standard MIB units, which are discussed in the various RFCs, are approved for certain protocols and application programs 14. Moreover, the well known PREMOSY tool, which is a part of EMANATE, can extract a MIB to create a specialized MIB source. When functionality that is not included in a standard MIB is required to store management information, a proprietary MIB may be generated. Configuration data is stored in configuration MIB units.

A MIB unit preferably is developed when an application program 14 is written. EMANATE, however, generates many of the data structures, labels, and code (e.g., "C" code) utilized to manage each attribute. Some of the generated code may be utilized as a template that must be modified for an application specific instrumentation of the attribute management. Once complied, the MIB units are stored in nonvolatile memory so that they may be loaded into short term memory, as necessary, after start-up. After start-up, static configuration data is located in a configuration file in nonvolatile memory, and then stored in the appropriate MIB units. Once the configuration data is stored in the appropriate MIB unit(s) (i.e., within a configuration record or configuration MIB units), each such MIB unit may be accessed by the application programs 14 on the router platform, or by remote and local management applications.

As is known in the art, router management in a networking environment commonly follows a client/server format. Specifically, a router system administrator may access a router 12 as a client from a network device that communicates with the router 12 via a network (e.g., the World Wide Web). To manage the router 12, the client preferably accesses the MIB records and other programs within the router 12 through a server/management interface (discussed below) that is a part of the router software and hardware. In a preferred embodiment, several management level interfaces are used to manage, monitor and provision data for the platform. Among those are SNMP/MIB interfaces, embedded command line (CLI), web servers, Java Virtual Machines ("JVM") and dynamic positioning/configuration services. At the core of each of these management interfaces is a requirement to both fetch and set the router's configuration objects and management objects of the MIB. In preferred embodiments of the invention, since the management interfaces expect the same general processing of both management and configuration data, the application programs 14 also can present a common API to provide these functions to all of the management interfaces.

Figure 17:
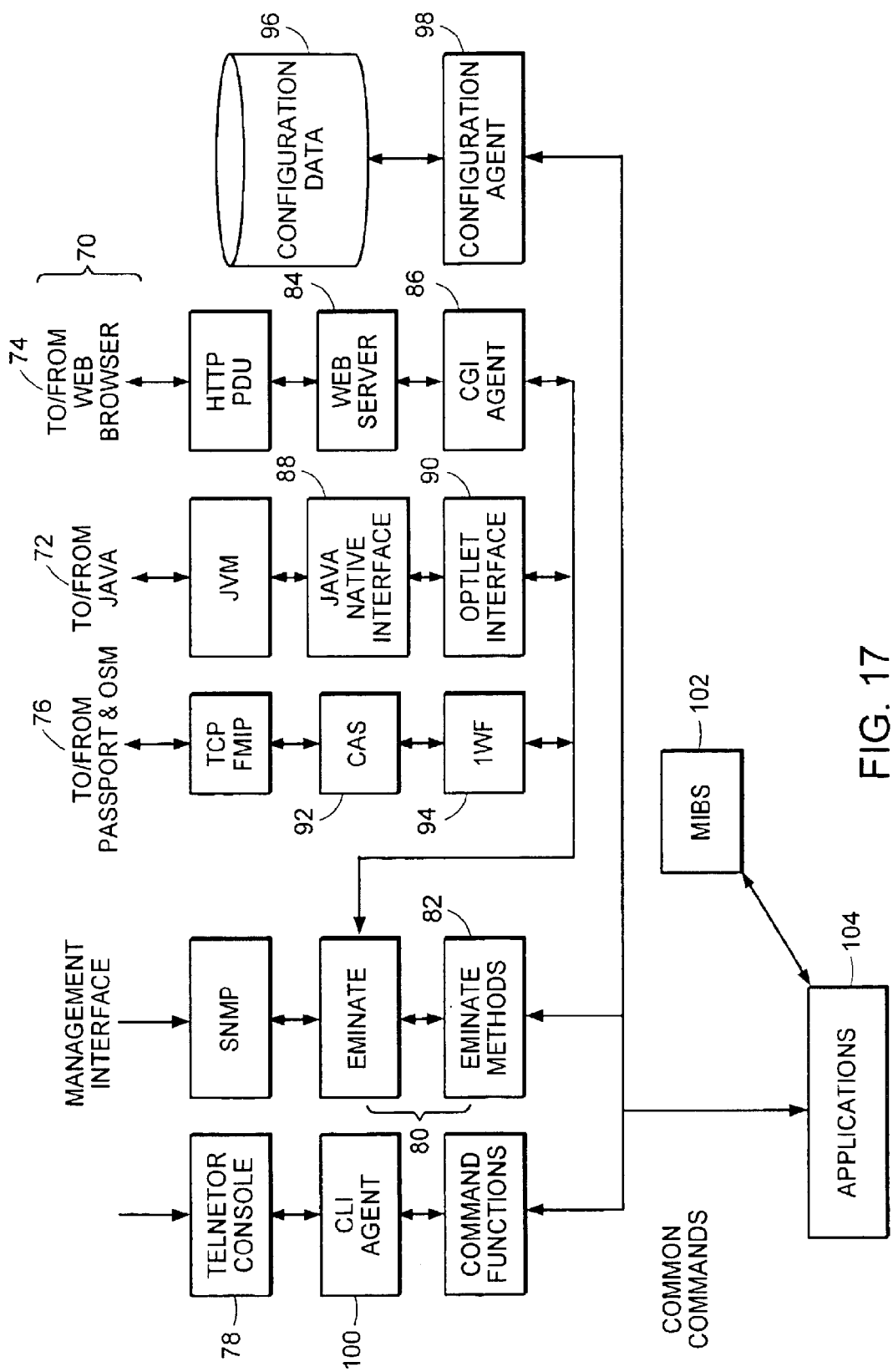
FIG. 17 schematically shows one embodiment of the invention in which the router platform includes an overall management interface that includes Java Virtual Machine interface, an HTP interface, and a TCP/IP interface to interface with a system administrator.

FIG. 17 schematically shows one embodiment of the invention in which the router platform includes an overall management interface 70 that includes Java Virtual Machine interface 72, an HTTP interface 74, and a TCP/IP interface 76 to interface with the system administrator (client). Other embodiments of the invention, however, utilize other or additional interface types (e.g., Telnet interface 78, also shown). Accordingly, description of these three interfaces 72, 74, and 76 is by example only and not intended to limit the scope of preferred embodiments of the invention.

Each of the specific interfaces includes respective management agents that process and forward messages to an EMANATE stage 80. For example, a message requesting the temperature of the router 12 may be forwarded from the HTTP interface agent 86 (referred to below as "common gateway interface agent 86") to the EMANATE stage 80. The EMANATE stage 80, which includes an EMANATE methods block 82, then locates the appropriate application program 14 to fulfill the request, and then transmits a request message to such application program 14. Among other methods, the appropriate application program 14 may be determined by accessing a list of application programs 14 that registered with EMANATE. Specifically, the application program 14 that registered (with EMANATE upon initialization or some other time) the specific object of interest is located. Once located, EMANATE forwards a message to such application program 14 requesting the information of interest. Such message includes one of the above noted six commands. The application program 14 responsively forwards a message to the appropriate object requesting the specific operation. Continuing with the above temperature example, the appropriate application program 14 may forward a "get" command to a temperature object. In response, the temperature object determines the temperature (via its local "get" method) and forwards a message to the requesting application program 14 identifying the record having the temperature.

The return message then is forwarded to EMANATE, which understands the format of the received record from the initial registration process of the application program 14. EMANATE thus determines the temperature value from the record, and then forwards such value to the appropriate agent which, in this example, is the HTTP agent 86. The HTTP agent 86 then forwards the message in HTTP format back to the system administrator client for display.

Accordingly, the application program 14 processes MIB units 102 and records via the six common functions. Each application program 14 thus is not required to be configured with the many interface types.

As suggested above, the HTTP interface 74 preferably includes a web server 84 and a common gateway interface agent 86 (noted above) for forwarding the HTTP messages to EMANATE. In a similar manner, the JVM interface 72 includes a JAVA native interface 88 and an optlet interface 90 to communicate with EMANATE. Further, the TCP/IP interface 76 utilizes a CAS 92 (i.e., a passport management agent) and an IWF 94 (i.e., inter-working functions) to communicate with EMANATE.

The platform also includes a nonvolatile database 96 of persistent configuration data, and a configuration agent 98 that manages interactions with the persistent configuration data. Although such information also may be coupled to EMANATE, in preferred embodiments the configuration agent 98 is configured to communicate directly with the application programs 14 via the six common commands. This increases the speed of the configuration process. Accordingly, when the platform is reset or rebooted, application programs 14 initially are provisioned by the configuration agent 98. This initial configuration represents the initial state of the platform. All configuration data is persistent across reboots and resets and thus, is stored in the nonvolatile database. Accordingly, at initialization, the configuration agent 98 reads the persistent configuration data, and subsequently uses its contents to provision all active application programs 14 by storing such data in the appropriate MIB units 102.

At a later time, the system administrator may change the initial configuration of the platform by changing various configuration parameters. Such modifications, however, preferably are not saved with the persistent configuration data. Accordingly, upon a reboot, the initial configuration data in the configuration database 96 are utilized. In a similar manner, the system administrator may save the current state of the platform to some other nonvolatile configuration memory location so that the current state may be restored upon failure. To that end, the configuration agent 98 preferably locates a list of MIB units 102 that have been changed since initialization. The configuration agent 98 then utilizes the GET command to obtain the current values of the modified MIB units, and then writes any non-default values to the above nonvolatile configuration memory location.

After an application program 14 is initialized, it registers with the configuration agent 98. The configuration agent 98 then configures the application program 14 by calling the "set" command for every record instance in the boot configuration file. The configuration agent 98 then signals the application program 14 with an "initialization complete" notification message. Upon receipt of such message, the application program 14 then registers with all the other management interfaces. Since some embodiments permit the management applications to also configure and manage the application programs 14, it is preferred that the application program 14 obtain its initial configuration first (i.e., from the persistent configuration data) before exposing its management data to the other interfaces. As noted above, the application programs 14 also register with EMANATE so that EMANATE includes a record of each application program 14, and the format of the objects managed by each application program 14.

After all application programs 14 have been initialized, the system administrator can source any number of MIB records. Specifically, MIB records with configuration data and those with management data are accessed in an identical manner. Accordingly, from the perspective of the application programs 14, there is no difference between changing configuration MIB units and changing management MIB units.

General Services Function Library

The General Services function library ("General Services API 38") provides miscellaneous functionality for the router platform, such as error checking and debugging. Error checking and debugging may be accomplished through the use of an event log, message queue monitoring, dynamic run-time error checking, and a debugging program.

The event log allows application programs 14 to store information in a common repository. This information can relate to events, such as administrator warnings and programmer debugging information. The event log logs each event using an event code, and parameters for the event. Events preferably are defined in terms of an Event Description Language ("EDL"). Each event contains the name of the event, the event level, and the event string. Such event strings are used only when viewing the log contents and are not required during the logging process. The event strings are stored with the application program 14, such as in a separate section of the application's image or linked into the application's data section (to decrease the overall size of the event log).

The event log provides crash survivability. To that end, a logging API preferably is provided to allow an application program 14 to log its events. The logging API enables application programs 14 to write directly into the event log memory region. This feature prevents the loss of the event log if the system fails. Since the memory location is fixed for the event log, diagnostic software can be programmed to avoid the memory and leave the event log intact in the event of a crash.

The event log provides efficient storage. In preferred embodiments, all events from different application programs 14 are stored in one common log file. The common log file may include the event log, and filter information. Event filters determine which events are logged and which events are discarded. A filter API preferably is provided to configure the filters. Among other things, events may be filtered by their entity/event number and priority levels.

A lookup API also may be provided to view the log contents. This API enables users to extract text strings from the string table according to event codes. Since application string tables are not in the log memory, the actual text strings come from the application program 14. If the application program 14 is not present at the time a lookup request, an attempt is made to find the application's event string in the boot media.

When viewing event logs, strings are loaded if the application program 14 is present. A log reading thread handles viewing activities, while Remote Procedure Calls ("RPCs") are used to communicate the viewing requests and replies. Each event preferably is displayed as a separate task that is independent of logging. The display routine takes a log event and its parameters, and uses the event code to find the appropriate text format for printing.

In summary, event logs are separated from the event text strings. The event log resides in a well known memory area, and event text strings are stored in string tables with corresponding application programs 14. Events are logged based on their filters, which includes the application type and priority levels. Filters also preferably are stored in the log memory.

Figure 18:
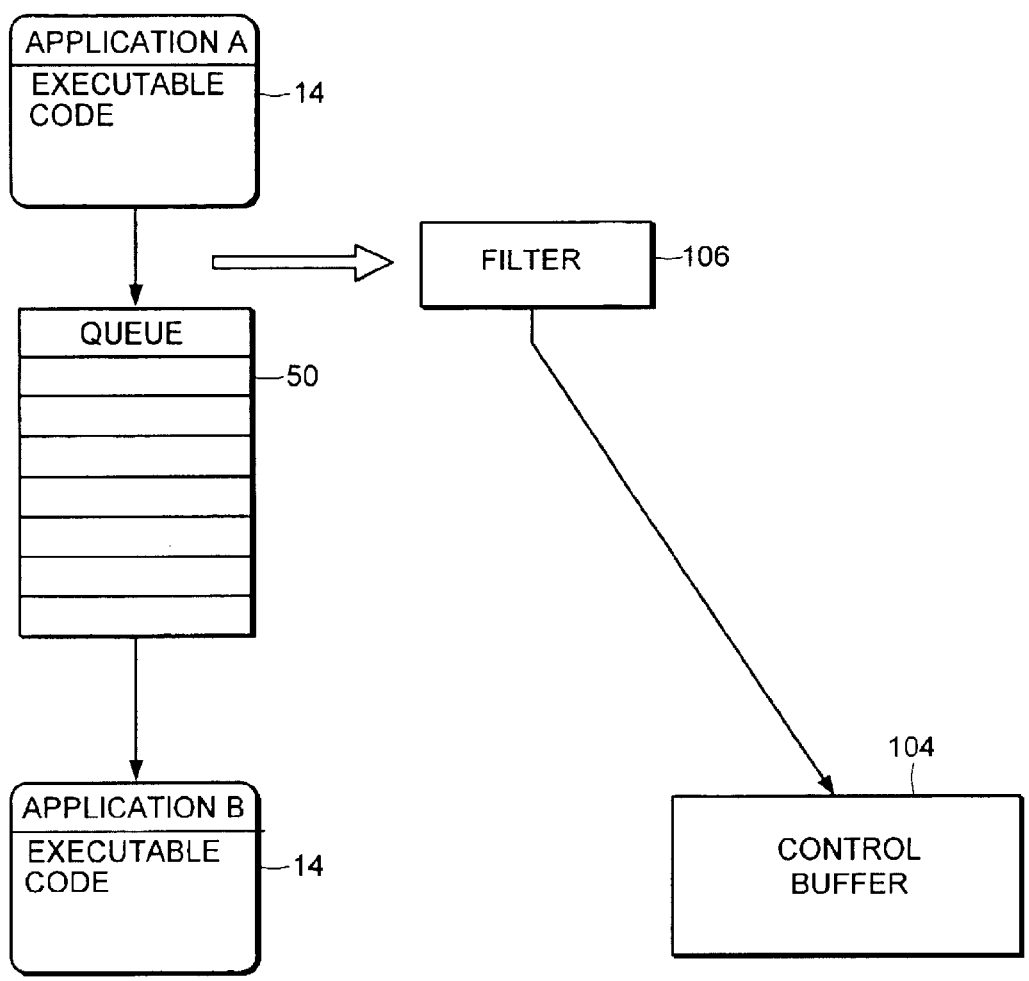
FIG. 18 schematically shows a preferred embodiment of a control buffer that receives messages written into an application message queue.

Message queue monitoring is another feature of General Services API 38. Queue monitoring applies to all queues (e.g., application queues or port I/O queues) and allows monitoring of data messages and control messages. Upon a general configuration of all the application programs 14, the queue monitoring facility is activated. In other embodiments, the queue monitoring facility may be activated by a debugger. The primary activity that occurs upon initialization of such facility is the creation of a control buffer 104. As shown in FIG. 18, the control buffer 104 is a software FIFO buffer into which the desired messages are copied. The size of this buffer, along with the size of the captured messages, determines how many messages can be captured.

Filter configuration determines which messages are copied to the control buffer 104. Filters 106 (FIG. 18) are applied on a per queue basis. At any point in time, any number of queues can be monitored. Each queue may be assigned a set of one or more filters 106. Filters 106 can be applied to the message, the control buffer body, or both. Each filter 106 contains a mask/value pair, where the mask is a bitmask that is overlaid over the data to form an "and" set. Accordingly, a match is deemed to occur if the mask value equals the filter value. Stated another way, the message is copied to the control buffer 104 when all elements of the filter match. Any filter 106 can be declared to be a trigger that determines when the capturing of data starts and ends. Accordingly, each message queue 50 may have an associated set of filters 106 that includes a start trigger, and one or more stop triggers. When the start trigger is engaged, messages that match such filter 106 are captured. The different stop triggers may be named "before filter/trigger", "middle filter/trigger", and "after filter/trigger." The names of these filters 106 refer to the location of the data being captured relative to the named trigger. The Before trigger thus captures data up to the point when the trigger is engaged. The After trigger continues to capture data until the control buffer point is full. The middle trigger fills half the control buffer 104 and stops so that the trigger point is in the middle of the buffer. Triggers are optional in preferred embodiments. The queue monitoring can be configured to start capturing immediately and stop when full, or to continue wrapping until capture is explicitly stopped.

During the data capture phase, the filters 106 are applied to messages on the various queues. The filters 106 can be configured to run on the read or write phase of a queue. If the filter's criteria are met, the message's contents and selected buffer contents are copied to the control buffer 104. The amount of data to be copied to the control buffer 104 is configurable.

The control buffer 104 may be accessed at any time during execution of an application program 14, or after an application program 14 fails. The control buffer 104 is inherent in the queue and thus, not internal to any application program 14. If an application program 14 fails, the various messages that have been sent to the queue may be retrieved and analyzed for debugging purposes. By maintaining the control buffer 104 and filters 106 as part of the queuing system and not part of the application program 14, the application program 14 does not require additional debugging code. By reducing the amount of code, the scalability of the system is increased and more application programs 14 may be added.

The general systems API may also include dynamic run-time error checking that is implemented through the configuration agent 98, and the MIB. This enables checking either at application start time, or while an application program 14 is running. The general systems API also performs symbol lookup when application programs 14 are loaded. The loader has a symbol lookup table that includes only global symbols. The symbols are the symbols that each application program 14 includes as part of its external interface. The ability to convert an address to a global symbol can be used for debugging when using events from the event log. The lookup function takes an address and returns the matching symbol name.

A debug application also is part of the General Services API 38. Specifically, the debug application provides visibility into the internal data structures, and facilities to reproduce bugs (e.g., stress adders and performance monitors). The debug application is separably loadable for use by developers so that it does not consume resources during general operations of the system. The debug application enables memory reads and writes, and provides thread information. The thread information includes a list of all threads 56 in the system, a list of message queues 50 the thread 56 has created or opened, shared memory opened, the number of buffers being consumed, and the amount of memory that the thread 56 is using. The debugger also provides a list of all memory being used by user and the amount of shared memory being used. In addition, the debugger also provides message queue information including all message queues 50 in the system, a list of all registered events, and the handler functions for the events. The debugger also keeps track of all threads 56 accessing input/output.

Mapper Function Library

The Mapper function library ("mapper API 22") provides an interface between the control plane 26 and the forwarding plane 20. For more information relating to the mapper API 22, see the above incorporated provisional application entitled, "JWFD: CONTROLLING THE FORWARDING PLANE OF SWITCHES AND ROUTERS THROUGH A NEW JAVA API." It should be noted, however, that although a JAVA implementation is discussed in such application, principles of preferred embodiments described in the above noted application may be implemented in other well known programming languages, such as "C" and "C++."

As previously suggested, preferred embodiments of the invention (e.g., each of the function libraries) may be implemented in any conventional computer programming language. For example, preferred embodiments may be implemented in a procedural programming language (e.g., "C") or an object oriented programming language (e.g., "C++" or "JAVA"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

I claim:

1. A method of managing memory utilized by a process executing on a computer system having an operating system, the process including at least one thread, the method comprising:

intercepting messages forwarded between the process and the operating system;

ascertaining, from at least one of the intercepted messages, locations of at least two memory segments that are allocated to a given thread in the process;

storing a linked list of memory segments associated with the given thread;

monitoring the given thread; and freeing each memory segment indicated in the linked list of memory segments if it is determined that the given thread has stopped operating.

2. The method as defined by claim 1 wherein the given thread that has stopped executing is deemed to have stopped operating.

3. The method as defined by claim 1 wherein each thread executed a prescribed function, an executing thread that is determined to have been not executing its prescribed function being deemed to have stopped operating.

4. The method as defined by claim 1 wherein an executing thread that is corrupting other processes or threads is deemed to have stopped operating.

5. The method as defined by claim 1 wherein locations of each memory segment is stored in the linked list in a memory device, the act of freeing comprising:

retrieving the location of the memory segment from the linked list in the memory device; and forwarding a release message to the operating system, the release message including both data identifying the location of each memory segment, and a request to free each memory segment.

6. The method as defined by claim 1 wherein the operating system utilizes a standard operating system application program interface.

7. The method as defined by claim 6 wherein the operating system is POSIX.

8. An apparatus for managing memory utilized by a process executing on a computer system having an operating system, the process including at least one thread, the apparatus comprising:

an intercepting module that intercepts messages forwarded between the process and the operating system;

a location ascertaining module that ascertains, from at least one intercepted messages, a location of each memory segment of at least two memory segments that are allocated to a given thread in the process;

storing the location of each memory segment associated with the given thread in a linked list:

a monitoring thread that monitors the given thread; and a segment freeing module that frees each memory segment indicated in the linked list if it is determined that the given thread has stopped operating.

9. The apparatus as defined by claim 8 wherein the given thread that has stopped executing is deemed to have stopped operating.

10. The apparatus as defined by claim 8 wherein each thread executes a prescribed function, an executing thread that is determined to have been not executing its prescribed function being deemed to have stopped operating.

11. The apparatus as defined by claim 8 wherein an executing thread that is corrupting other processes or threads is deemed to have stopped operating.

12. The apparatus as defined by claim 8 wherein the location of each memory segment is stored in the linked list in a memory device, the segment freeing module comprising:

a retrieving module that retrieves the location of each memory segment from the linked list in the memory device; and an output that forwards a release message to the operating system, the release message including both data identifying the location of each memory segment, and a request to free each memory segment.

13. The apparatus as defined by claim 8 wherein the operating system utilizes a standard operating system application program interface.

14. A computer program product for use on a computer system for managing memory utilized by a process executing on a computer system having an operating system, the process including at least one thread, the computer program product comprising a computer usable medium having computer readable program code thereon, the computer readable program code including: program code for intercepting messages forwarded between the process and the operating system;

program code for ascertaining, from at least one intercepted message, the locations of at least two memory segments allocated to a given thread in the process;

program code for generating a linked list of the at least two memory segments associated with the given thread;

program code for monitoring the given thread; and program code for freeing the locations of the at least two memory segments by traversing the linked list if it is determined that the given thread has stopped operating.

15. The computer program as defined by claim 14 wherein the given thread that has stopped executing is deemed to have stopped operating.

16. The computer program product as defined by claim 14 wherein each thread executes a prescribed function, an executing thread that is determined to have been not executing its prescribed function being deemed to have stopped operating.

17. The computer program produce as defined by claim 14 wherein an executing thread that is corrupting other processes or threads is deemed to have stopped operating.

18. The computer program product as defined by claim 14 wherein the the locations of the at least two memory segments are stored in the linked list in a memory devices, the program code for freeing comprising:

program code for retrieving the location of the at least two memory segment from the linked list of the memory device; and program code for forwarding a release message to the operating system, the release message including both data identifying the locations of the at least two memory segments, and a request to free the at least two memory segments.

19. The computer program product as defined by claim 14 wherein the operating system utilizes a standard operating system application program interface.

20. The computer program product as defined by claim 19 wherein the operating system is POSIX.

21. A method of managing memory utilized by a process executing on a computer system having an operating system, the process including at least one thread comprised of at least two memory segments, the method comprising:
   intercepting memory allocation requests from the process, the memory allocation requests being directed toward the operating system and requesting that the operating system allocate at least two memory segments for a given thread in the process;
   storing locations of the at least two memory segments in a linked list associated with the given thread;
   forwarding the memory allocation requests to the operating system, the operating system responsively allocating memory segments for the given thread;
   receiving a memory segment message from the operating system identifying the locations of the at least two memory segments allocated for the given thread;
   storing the location of each memory segment in a linked list associated with the given thread; and
   forwarding a memory allocation reply message to the process identifying the locations of the at least two memory segments associated with the given thread.

22. The method as defined by claim 21 further comprising:
   monitoring the given thread in the process; and
   freeing the at least two memory segments if it is determined that the given thread has stopped operating.

23. The method as defined by claim 22 wherein the given thread that has stopped executing is deemed to have stopped operating.

24. The method as defined by claim 22 wherein each thread executes a prescribed function, an executing thread that is determined to have been not executing its prescribed function being deemed to have stopped operating.

25. The method as defined by claim 22 wherein an executing thread that is corrupting other processes or threads is deemed to have stopped operating.

26. The method as defined by claim 22 wherein the locations of the at least two memory segments are stored in the linked list in a memory device, the act of freeing comprising:
   retrieving the locations of the at least two memory segments from the linked list in the memory device; and
   forwarding a release message to the operating system, the release message including both data identifying the locations of the at least two memory segments, and a request to free the at least two memory segments.

27. The method as defined by claim 21, wherein the operating system utilizes a standard operating system application program interface.

28. The method as defined by claim 27 wherein the operating system is POSIX.

29. The method as defined by claim 21 wherein the memory allocation requests and memory segment messages are received by an interceptor module, the interceptor module being independent from the operating system.

30. An apparatus for managing memory utilized by a process executing on a computer system having an operating system, the process including at least one thread executing using at least two memory segments, the apparatus comprising:
   a first input that receives a memory segment messages from the operating system identifying the locations at least two memory segments allocated for the given thread, the memory segment messages being forwarded from the operating system in response to memory allocation requests from the process to allocate the memory segments for the given thread;
   a memory device including a linked list for storing the locations of the at least two memory segments and
   a first output that forwards a memory allocation reply messages to the process, the memory allocation reply messages identifying the locations of each memory segment of the given thread.

31. The apparatus as defined by claim 30 further comprising:
   a second input that receives the memory allocation requests from the process, the memory allocation requests being directed toward the operating system; and
   a second output that forwards the memory allocation requests to the operating system.

32. The apparatus as defined by claim 30 wherein the first input and first output collectively utilize at least one interface for interfacing with messages.

33. The apparatus as defined by claim 30 further comprising:
   a monitoring thread that monitors the given thread in the process; and
   a segment freeing module that frees the memory segments if it is determined that the given thread has stopped operating.

34. The apparatus as defined by claim 33 wherein the given thread that has stopped executing is deemed to have stopped operating.

35. The apparatus as defined by claim 33 wherein each thread executes a prescribed function, an executing thread that is determined to have been not executing its prescribed function being deemed to have stopped operating.

36. The apparatus as defined by claim 33 wherein an executing thread that is corrupting other processes or threads is deemed to have stopped operating.

37. The apparatus as defined by claim 33 wherein the segment freeing module comprises:
   a retriever that retrieves the locations of the at least two memory segments from the linked list in the memory device; and
   a releaser that forwards a release messages to the operating system, the release messages including both data identifying the locations of the at least two memory segments, and a request to free the at least two memory segments.

38. The apparatus as defined by claim 30 wherein the operating system utilizes a standard operating system application program interface.

39. A computer program product for use on a computer system for managing memory utilized by a process executing on a computer system having an operating system, the process including at least one thread each thread executing using at least two memory segments, the computer program product comprising a computer usable medium having computer readable program code thereon, the computer readable program code including:

program code for receiving memory allocation requests from the process, the memory allocation requests being directed toward the operating system and requesting that the operating system allocate memory segments for a given thread in the process;

program code for forwarding the memory allocation requests to the operating system, the operating system responsively allocating at least two memory segments for the given thread;

program code for receiving memory segment messages from the operating system identifying the locations of the at least two memory segments allocated for the given thread;

program code for storing the locations of the memory segments; and program code for forwarding at least two memory allocation reply messages to the process identifying the locations of the at least two memory segments of the given thread.

40. The computer program product as defined by claim 39 further comprising:

program code for monitoring the given thread in the process; and program code for freeing the memory segments if it is determined that the given thread has stopped operating.

41. The computer program product as defined by claim 40 wherein the given thread that has stopped executing is deemed to have stopped operating.

42. The computer program as defined by claim 40 wherein each thread executes a prescribed function, an executing thread that is determined to have been not executing its prescribed function being deemed to have stopped operating.

43. The computer program product as defined by claim 40 wherein an executing thread that is corrupting other processes or threads is deemed to have stopped operating.

44. The computer program product as defined by claim 40 wherein the locations of the at least two memory segments are stored in a memory device, the program code for freeing comprising:

program code for retrieving the locations of the at least two memory segments from the memory device; and program code for forwarding a release messages to the operating system the release messages including both data identifying the locations of the at least two memory segments, and a request to free the at least two memory segments.

45. The computer program product as defined by claim 40 wherein the operating system utilizes a standard operating system application program interface.

* * * * *

UNITED STATES PATENT AND TRADEMARK OFFICE
CERTIFICATE OF CORRECTION

PATENT NO. : 6,842,901 B1  Page 1 of 1
APPLICATION NO. : 09/326007
DATED : January 11, 2005
INVENTOR(S) : Miller It is certified that error appears in the above-identified patent and that said Letters Patent is hereby corrected as shown below:

column 27, line 65, delete "messages" and insert therefore --message--.

column 27, line 66, insert therefore --the-- before "at least two memory segments".

column 28, line 41, delete "the" before "locations".

column 28, line 65, delete "location" and insert therefore –locations–.

column 28 line 66, delete "segment" and insert therefore --segments-- column 29 line 28, delete "location" and insert therefore –locations–.

column 29 line 28 delete "each memory segment" and insert therefore --the at least two memory segments--.

column 30 line 7, insert therefore –of the–before "locations".

column 30 line 17, delete "each memory segment" and insert therefore --the at least two memory segments--.

Signed and Sealed this

Eighth Day of August, 2006

JON W. DUDAS
*Director of the United States Patent and Trademark Office*